(12) United States Patent
Howell et al.

(10) Patent No.: US 9,588,803 B2
(45) Date of Patent: Mar. 7, 2017

(54) EXECUTING NATIVE-CODE APPLICATIONS IN A BROWSER

(75) Inventors: Jonathan R. Howell, Seattle, WA (US); Jacob R. Lorch, Bellevue, WA (US); Jeremy E. Elson, Kirkland, WA (US); John R. Douceur, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 740 days.

(21) Appl. No.: 12/463,892

(22) Filed: May 11, 2009

(65) Prior Publication Data
US 2010/0287618 A1    Nov. 11, 2010

(51) Int. Cl.
*G06Q 99/00* (2006.01)
*G06F 9/46* (2006.01)
(Continued)

(52) U.S. Cl.
CPC .............. *G06F 9/468* (2013.01); *G06Q 21/53* (2013.01); *G06Q 20/1235* (2013.01)

(58) Field of Classification Search
CPC ............................ G06Q 20/1235; G06F 21/53
(Continued)

(56) References Cited

U.S. PATENT DOCUMENTS 4,874,164 A * 10/1989 Miner .................... A63F 13/00
345/545
5,309,978 A    5/1994 Noble, Jr. et al.
(Continued)

FOREIGN PATENT DOCUMENTS

CN    1380610 A    11/2002
CN    1906560 A    1/2007
(Continued)

OTHER PUBLICATIONS

Microsoft® Computer Dictionary, Fifth Edition, Microsoft Press, A Division of Microsoft Corporation, One Microsoft Way Redmond, Washington 98052-6399, Copyright © 2002 by Microsoft Corporation.*

(Continued)

*Primary Examiner* — James D Nigh
(74) *Attorney, Agent, or Firm* — Alin Corie; Sandy Swain; Micky Minhas

(57) ABSTRACT

Techniques for leveraging legacy code to deploy native-code desktop applications over a network (e.g., the Web) are described herein. These techniques include executing an application written in native code within a memory region that hardware of a computing device enforces. For instance, page-protection hardware (e.g., a memory management unit) or segmentation hardware may protect this region of memory in which the application executes. The techniques may also provide a narrow system call interface out of this memory region by dynamically enforcing system calls made by the application. Furthermore, these techniques may enable a browser of the computing device to function as an operating system for the native-code application. These techniques thus allow for execution of native-code applications on a browser of a computing device and, hence, over the Web in a resource-efficient manner and without sacrificing security of the computing device.

19 Claims, 5 Drawing Sheets

(51) Int. Cl.
*G06Q 20/12* (2012.01)
*G06F 21/53* (2013.01)

(58) Field of Classification Search
USPC .............................................. 705/50; 726/26
See application file for complete search history.

(56) References Cited

U.S. PATENT DOCUMENTS

| | | |
|---|---|---|
| 5,598,563 A | 1/1997 | Spies |
| 5,689,626 A | 11/1997 | Conley |
| 5,732,282 A | 3/1998 | Provino et al. |
| 5,754,830 A | 5/1998 | Butts et al. |
| 5,815,686 A | 9/1998 | Earl et al. |
| 5,819,091 A | 10/1998 | Arendt et al. |
| 5,922,056 A | 7/1999 | Amell et al. |
| 5,926,631 A | 7/1999 | McGarvey |
| 6,357,003 B1 | 3/2002 | Zarrin et al. |
| 6,546,425 B1 | 4/2003 | Hanson et al. |
| 6,578,054 B1 | 6/2003 | Hopmann et al. |
| 666,837 A1 | 12/2003 | Wang et al. |
| 6,665,731 B1 | 12/2003 | Kumar et al. |
| 6,721,288 B1 | 4/2004 | King et al. |
| 681,367 A1 | 11/2004 | Yao et al. |
| 6,874,066 B2* | 3/2005 | Traversat et al. ............ 711/135 |
| 6,876,996 B2 | 4/2005 | Czajkowski et al. |
| 702,830 A1 | 4/2006 | Kim |
| 7,065,607 B2 | 6/2006 | England et al. |
| 7,185,359 B2 | 2/2007 | Schmidt et al. |
| 7,272,782 B2 | 9/2007 | Sneh |
| 7,275,105 B2 | 9/2007 | Bloch et al. |
| 7,287,259 B2 | 10/2007 | Grier et al. |
| 7,293,107 B1 | 11/2007 | Hanson et al. |
| 7,334,122 B2 | 2/2008 | Burokas et al. |
| 7,421,579 B2 | 9/2008 | England et al. |
| 7,444,337 B2 | 10/2008 | Zhou et al. |
| 7,493,626 B2 | 2/2009 | Resch |
| 7,496,495 B2 | 2/2009 | Solomon et al. |
| 7,502,823 B2 | 3/2009 | Garg et al. |
| 7,506,083 B1 | 3/2009 | Lemke et al. |
| 7,526,561 B2 | 4/2009 | Bloch et al. |
| 7,568,619 B2 | 8/2009 | Todd et al. |
| 7,574,208 B2 | 8/2009 | Hanson et al. |
| 7,574,709 B2 | 8/2009 | Erlingsson et al. |
| 7,596,783 B2 | 9/2009 | Huang et al. |
| 7,613,862 B2 | 11/2009 | Mihai |
| 7,627,728 B1 | 12/2009 | Roeck et al. |
| 7,640,009 B2 | 12/2009 | Belkin et al. |
| 7,644,264 B1 | 1/2010 | Olsen |
| 7,676,538 B2 | 3/2010 | Potter et al. |
| 7,685,593 B2 | 3/2010 | Solomon et al. |
| 7,694,139 B2 | 4/2010 | Nachenberg et al. |
| 7,694,187 B2 | 4/2010 | Souders et al. |
| 7,703,081 B1 | 4/2010 | Buches |
| 7,703,083 B2 | 4/2010 | Shi et al. |
| 7,725,613 B2 | 5/2010 | Bhardwaj et al. |
| 7,769,720 B2 | 8/2010 | Armington |
| 7,774,762 B2 | 8/2010 | Rochette et al. |
| 7,788,669 B2 | 8/2010 | England et al. |
| 7,812,985 B2 | 10/2010 | Nguyen et al. |
| 7,844,442 B2 | 11/2010 | Tzruya |
| 7,870,153 B2 | 1/2011 | Croft et al. |
| 7,882,247 B2 | 2/2011 | Sturniolo et al. |
| 7,886,183 B2 | 2/2011 | Krishnan et al. |
| 7,913,252 B2 | 3/2011 | Shlomai |
| 7,937,612 B1 | 5/2011 | Lyadvinsky et al. |
| 7,971,049 B2 | 6/2011 | TeNgaio et al. |
| 7,990,823 B2 | 8/2011 | Tanaka et al. |
| 7,996,493 B2 | 8/2011 | Hill |
| 8,010,710 B2 | 8/2011 | Sumi |
| 8,019,861 B2 | 9/2011 | Ginzton |
| 8,060,656 B2 | 11/2011 | Hanson et al. |
| 8,064,598 B2 | 11/2011 | Vaha-Sipila et al. |
| 8,065,444 B2 | 11/2011 | Lemke et al. |
| 8,074,231 B2 | 12/2011 | Hunt et al. |
| 8,117,554 B1 | 2/2012 | Grechishkin et al. |
| 8,131,919 B1 | 3/2012 | Gasser et al. |
| 8,135,877 B2 | 3/2012 | Wang |
| 8,150,971 B2 | 4/2012 | Lublin et al. |
| 8,195,774 B2 | 6/2012 | Lambeth et al. |
| 8,196,153 B1 | 6/2012 | Cesare et al. |
| 8,214,849 B2 | 7/2012 | Cooper |
| 8,237,970 B2 | 8/2012 | Nguyen et al. |
| 8,285,987 B1 | 10/2012 | Kimball et al. |
| 8,332,652 B2 | 12/2012 | Boivie et al. |
| 8,346,983 B2 | 1/2013 | Lim et al. |
| 8,347,063 B2 | 1/2013 | Panesar et al. |
| 8,407,727 B2 | 3/2013 | Eom et al. |
| 8,418,236 B1 | 4/2013 | Havemose |
| 8,424,082 B2 | 4/2013 | Chen et al. |
| 8,429,654 B2 | 4/2013 | Zhao et al. |
| 8,436,944 B2 | 5/2013 | Murase et al. |
| 8,453,253 B2 | 5/2013 | Strong et al. |
| 8,463,951 B1 | 6/2013 | Priem |
| 8,505,029 B1 | 8/2013 | Chanda et al. |
| 8,645,977 B2 | 2/2014 | Jacobson et al. |
| 8,903,705 B2 | 12/2014 | Douceur et al. |
| 8,954,752 B2 | 2/2015 | Boivie et al. |
| 2002/0019972 A1 | 2/2002 | Grier et al. |
| 2002/0069192 A1 | 6/2002 | Aegerter |
| 2003/0208595 A1 | 11/2003 | Gouge et al. |
| 2003/0217174 A1 | 11/2003 | Dorenbosch et al. |
| 2003/0233404 A1 | 12/2003 | Hopkins |
| 2004/0015537 A1 | 1/2004 | Doerksen et al. |
| 2004/0168030 A1* | 8/2004 | Traversat ............ G06F 9/45504 711/133 |
| 2004/0172629 A1 | 9/2004 | Tene et al. |
| 2004/0177243 A1 | 9/2004 | Worley, Jr. |
| 2005/0033980 A1 | 2/2005 | Willman et al. |
| 2005/0044534 A1 | 2/2005 | Darweesh et al. |
| 2005/0060722 A1 | 3/2005 | Rochette et al. |
| 2005/0076186 A1 | 4/2005 | Traut |
| 2005/0080936 A1 | 4/2005 | Ray et al. |
| 2005/0091226 A1 | 4/2005 | Lin et al. |
| 2005/0102370 A1 | 5/2005 | Lin et al. |
| 2005/0108171 A1 | 5/2005 | Bajikar et al. |
| 2005/0177635 A1 | 8/2005 | Schmidt et al. |
| 2005/0187894 A1 | 8/2005 | Pletcher et al. |
| 2005/0198379 A1 | 9/2005 | Panasyuk et al. |
| 2005/0203962 A1 | 9/2005 | Zhou et al. |
| 2005/0240985 A1 | 10/2005 | Alkove et al. |
| 2006/0004927 A1 | 1/2006 | Rehman et al. |
| 2006/0005047 A1 | 1/2006 | Lekatsas et al. |
| 2006/0037072 A1 | 2/2006 | Rao et al. |
| 2006/0156418 A1 | 7/2006 | Polozoff |
| 2006/0161563 A1 | 7/2006 | Besbris et al. |
| 2006/0161982 A1 | 7/2006 | Chari et al. |
| 2006/0184931 A1 | 8/2006 | Rochette et al. |
| 2006/0248208 A1 | 11/2006 | Walbeck et al. |
| 2006/0259734 A1 | 11/2006 | Sheu et al. |
| 2006/0294518 A1 | 12/2006 | Richmond et al. |
| 2007/0061556 A1 | 3/2007 | Rothman et al. |
| 2007/0074191 A1 | 3/2007 | Geisinger |
| 2007/0078950 A1 | 4/2007 | Hopkins et al. |
| 2007/0134068 A1 | 6/2007 | Smith et al. |
| 2007/0136579 A1 | 6/2007 | Levy et al. |
| 2007/0136723 A1 | 6/2007 | Smith et al. |
| 2007/0169116 A1 | 7/2007 | Gujarathi et al. |
| 2007/0174910 A1 | 7/2007 | Zachman et al. |
| 2007/0198657 A1 | 8/2007 | Saliba et al. |
| 2007/0244980 A1 | 10/2007 | Baker, III et al. |
| 2007/0250838 A1 | 10/2007 | Belady et al. |
| 2007/0283324 A1 | 12/2007 | Geisinger |
| 2007/0288228 A1 | 12/2007 | Taillefer et al. |
| 2008/0005472 A1 | 1/2008 | Khalidi et al. |
| 2008/0005794 A1 | 1/2008 | Inoue et al. |
| 2008/0016339 A1 | 1/2008 | Shukla |
| 2008/0028401 A1 | 1/2008 | Geisinger |
| 2008/0127182 A1 | 5/2008 | Newport et al. |
| 2008/0127225 A1 | 5/2008 | Mullis, et al. |
| 2008/0127348 A1 | 5/2008 | Largman et al. |
| 2008/0222160 A1 | 9/2008 | MacDonald et al. |
| 2008/0222628 A1 | 9/2008 | Batra et al. |
| 2008/0263531 A1 | 10/2008 | Perry et al. |
| 2008/0276012 A1 | 11/2008 | Mesa et al. |

(56) References Cited

U.S. PATENT DOCUMENTS

| | | |
|---|---|---|
| 2009/0024757 A1 | 1/2009 | Proctor |
| 2009/0064196 A1 | 3/2009 | Richardson et al. |
| 2009/0094337 A1 | 4/2009 | Dias |
| 2009/0204960 A1 | 8/2009 | Ben-Yehuda et al. |
| 2009/0204961 A1 | 8/2009 | Dehaan et al. |
| 2009/0210871 A1 | 8/2009 | Dechovich |
| 2009/0217047 A1 | 8/2009 | Akashika et al. |
| 2009/0222304 A1 | 9/2009 | Higgins et al. |
| 2009/0249051 A1 | 10/2009 | TeNgaio et al. |
| 2009/0259993 A1 | 10/2009 | Konduri et al. |
| 2009/0265706 A1 | 10/2009 | Golosovker et al. |
| 2009/0282266 A1 | 11/2009 | Fries et al. |
| 2009/0282404 A1 | 11/2009 | Khandekar et al. |
| 2009/0282474 A1* | 11/2009 | Chen ................... G06F 21/53 726/21 |
| 2009/0307781 A1 | 12/2009 | Iga et al. |
| 2009/0328225 A1 | 12/2009 | Chambers et al. |
| 2010/0017461 A1 | 1/2010 | Kokkevis et al. |
| 2010/0017857 A1 | 1/2010 | Kramer |
| 2010/0023700 A1 | 1/2010 | Chen et al. |
| 2010/0031276 A1 | 2/2010 | Hsieh |
| 2010/0042636 A1 | 2/2010 | Lu |
| 2010/0042796 A1 | 2/2010 | Vasilevsky et al. |
| 2010/0042987 A1 | 2/2010 | Yamada |
| 2010/0070727 A1* | 3/2010 | Harris ................... G06F 9/528 711/163 |
| 2010/0082926 A1 | 4/2010 | Sahita et al. |
| 2010/0083015 A1 | 4/2010 | Yokota et al. |
| 2010/0115334 A1 | 5/2010 | Malleck et al. |
| 2010/0153659 A1 | 6/2010 | Lovell et al. |
| 2010/0158220 A1 | 6/2010 | Silverman |
| 2010/0169407 A1 | 7/2010 | Hsueh et al. |
| 2010/0169497 A1 | 7/2010 | Klimentiev et al. |
| 2010/0174833 A1 | 7/2010 | Filer et al. |
| 2010/0180275 A1 | 7/2010 | Neogi et al. |
| 2010/0185956 A1 | 7/2010 | Anantharaman et al. |
| 2010/0211663 A1 | 8/2010 | Barboy et al. |
| 2010/0211956 A1 | 8/2010 | Gopisetty et al. |
| 2010/0217853 A1 | 8/2010 | Alexander et al. |
| 2010/0262853 A1 | 10/2010 | Goda |
| 2010/0262977 A1 | 10/2010 | Havemose |
| 2010/0287263 A1 | 11/2010 | Liu et al. |
| 2010/0287548 A1 | 11/2010 | Zhou et al. |
| 2010/0293392 A1 | 11/2010 | Miyamoto |
| 2010/0306848 A1 | 12/2010 | Gellerich |
| 2010/0332629 A1 | 12/2010 | Cotugno et al. |
| 2011/0004878 A1 | 1/2011 | Divoux |
| 2011/0047376 A1 | 2/2011 | Mittal |
| 2011/0119494 A1 | 5/2011 | Huang et al. |
| 2011/0162082 A1 | 6/2011 | Paksoy et al. |
| 2011/0191494 A1 | 8/2011 | Turanyi et al. |
| 2011/0191788 A1 | 8/2011 | Jacobson et al. |
| 2011/0202739 A1 | 8/2011 | Grisenthwaite |
| 2011/0231670 A1 | 9/2011 | Shevchenko et al. |
| 2011/0246551 A1 | 10/2011 | Giancaspro et al. |
| 2011/0257992 A1 | 10/2011 | Scantland et al. |
| 2011/0264788 A1 | 10/2011 | Costa |
| 2011/0276806 A1 | 11/2011 | Casper et al. |
| 2011/0277013 A1 | 11/2011 | Chinta |
| 2011/0296487 A1 | 12/2011 | Walsh |
| 2011/0302330 A1 | 12/2011 | Cota-Robles et al. |
| 2011/0302415 A1 | 12/2011 | Ahmad et al. |
| 2011/0320520 A1 | 12/2011 | Jain |
| 2011/0320812 A1 | 12/2011 | Kuno et al. |
| 2012/0005192 A1 | 1/2012 | Bao et al. |
| 2012/0017213 A1 | 1/2012 | Hunt et al. |
| 2012/0036255 A1 | 2/2012 | Polsky |
| 2012/0036509 A1 | 2/2012 | Srinivasan et al. |
| 2012/0084562 A1 | 4/2012 | Farina et al. |
| 2012/0144042 A1 | 6/2012 | Lublin et al. |
| 2012/0159184 A1 | 6/2012 | Johnson et al. |
| 2012/0179485 A1 | 7/2012 | Saneii |
| 2012/0203932 A1 | 8/2012 | da Costa et al. |
| 2012/0222025 A1 | 8/2012 | Pandit |
| 2012/0227038 A1 | 9/2012 | Hunt et al. |
| 2012/0227058 A1 | 9/2012 | Hunt et al. |
| 2012/0227061 A1 | 9/2012 | Hunt et al. |
| 2012/0265742 A1 | 10/2012 | Burckhardt et al. |
| 2012/0266167 A1 | 10/2012 | Spiers et al. |
| 2012/0291094 A9 | 11/2012 | Forrester et al. |
| 2012/0296626 A1 | 11/2012 | Bond et al. |
| 2012/0297249 A1 | 11/2012 | Yang et al. |
| 2013/0031371 A1 | 1/2013 | McLellan et al. |
| 2013/0036431 A1 | 2/2013 | Douceur et al. |
| 2013/0054734 A1 | 2/2013 | Bond et al. |
| 2013/0060947 A1 | 3/2013 | Nelson |
| 2013/0151846 A1 | 6/2013 | Baumann et al. |
| 2013/0151848 A1 | 6/2013 | Baumann et al. |
| 2013/0152209 A1 | 6/2013 | Baumann et al. |
| 2013/0232345 A1 | 9/2013 | Johnson et al. |
| 2013/0254884 A1 | 9/2013 | Dalcher et al. |
| 2013/0333005 A1 | 12/2013 | Kim et al. |
| 2016/0026488 A1 | 1/2016 | Bond et al. |

FOREIGN PATENT DOCUMENTS

| | | |
|---|---|---|
| CN | 101174293 A | 5/2008 |
| CN | 101448255 A | 6/2009 |
| CN | 101632083 A | 1/2010 |
| CN | 101655798 A | 2/2010 |
| CN | 102077209 A | 5/2011 |
| EP | 1526425 A2 | 4/2005 |
| EP | 1925120 B1 | 5/2014 |
| WO | WO2008111049 A2 | 9/2008 |
| WO | WO2011027191 A1 | 3/2011 |

OTHER PUBLICATIONS

Microsoft—TechNet, Device Management and Installation Step-by-Step Guide, retrieved on Apr. 14, 2011 at <<http://technet.microsoft.com/en-us/library/dd919230%28WS.10%29.aspx>>, 2 pages.

Douceur, et al., "Leveraging Legacy Code to Deploy Desktop Applications on the Web", retrieved on Oct. 11, 2010 at <<http://research.microsoft.com/pubs/72878/xax-osdi08.pdf>>, USENIX Association, Proceedings of Conference on Operating Systems Design and Implementation, San Diego, California, 2008, pp. 339-354.

Haff, "RingCube brings 'containers' to the client", retrieved on Oct. 11, 2010 at <<http://news.cnet.com/8301-13556_3-10158247-61.html>>, CNET News, Feb. 6 2009, pp. 1-3.

"iKernel: Isolating Buggy and Malicious Device Drivers Using . . . ", SlideShare, Inc., retrieved on 8/4/11 at <<http://www.slideshare.net/Cameroon45/ikernel-isolating-buggy-and-malicious-device-drivers-using>>, 7 pages.

OSdata.com, "Maintenance and Administration," retrieved on Apr. 14, 2011 at <<http://www.osdata.com/holistic/maintain/maintain.htm>>, 8 pages.

Piotrowski, et al., "Virtics: A System for Privilege Separation of Legacy Desktop Applications", retrieved on Oct. 11, 2010 at <<http://www.eecs.berkeley.edu/Pubs/TechRpts/2010/EECS-2010-70.pdf>>, EECS Department, University of California at Berkeley, Technical Report No. UCB/EECS-2010-70, May 13 2010, pp. 1-21.

"Sun Ray Ultra-Thin Clients in Technical Computing", retrieved on Oct. 11, 2010 at <<http://www.sun-rays.org/lib/hardware/sunray/ds/sunray_tc.pdf>>, Sun Microsystems, Inc., Datasheet, 2003, pp. 1-2.

"User-Mode Driver Framework (UMDF)", Microsoft Windows, retrieved on Aug. 4, 2011 at <<http://msdn.microsoft.com/en-us/windows/hardware/gg463294.aspx>>, 1 page.

"Windows User Mode Driver Framework", From Wikipedia, the free encyclopedia, Retrieved on Aug. 4, 2011 at <<http://en.wikipedia.org/wiki/User-Mode_Driver_Framework>>, 2 pages.

Yee, et al., "Native Client: A Sandbox for Portable, Untrusted x86 Native Code", retrieved on Oct. 11, 2010 at <<https://agora.cs.illinois.edu/download/attachments/28320883/nativeclient.pdf>>, IEEE Symposium on Security and Privacy, 2009, pp. 1-15.

Zhang, et al., "A CORBA Trader-based Dynamic Binding Infrastructure in Pervasive Computing", retrieved on Oct. 11, 2010 at <<http://ieeexplore.ieee.org/stamp/stamp.jsp?tp=

(56) References Cited

OTHER PUBLICATIONS

&arnumber=4079032>>, International Symposium on Pervasive Computing and Applications, 2006, pp. 12-16.
Stokely, "The FreeBSD Handbook", 3rd Edition, vol. 1: User's Guide, FreeBSD Mall, Inc., Brentwood, CA., 2003, 408 pgs.
"Aquifer Application Services Platform Version 5.5", retrieved on Mar. 3, 2009 at <<http://www.sysmanagement.com/enterpriseProducts/overview.aspx>>, Systems Management Engineering 2003, 2 pages.
"Browser Swallos OS", retrieved on Mar. 3, 2009, at <<http://www.desktoplinux.com/news/NS2750645189.html>>, Ziff Davis Enterprise Holdings Inc., Dec. 1, 2008, 3 pages.
Chen, "Native Client: A Technology for Running Native Code on the Web", retrieved on Mar. 3, 2009 at <<http://google-code-updates.blogspot.com/2008/12/native-client-technology-for-running.html>>, Google Code Blog, Dec. 8, 2008, 21 pages.
Chernoff, et al., "Digital FX!32 Running 32-Bit x86 Applications on Alpha NT", retrieved on Mar. 3, 2009 at <<http://citeseerx.ist.psu.edu/viewdoc/summary?doi=10.1.1.21.8607>>, Proceedings of the USENIX Windows NT Workshop, Seattle, WA, Aug. 1997, 8 pages.
Chiueh, et al., "Integrating Segmentation and Paging Protection for Safe, Efficient and Transparents Software Extensions", retrieved on Mar. 3, 2009 at <<http://www.sigops.org/sosp99/slides/kernel/chiueh.ps>>, Computer Science Dept., State University of New York, NY., 22 pages.
Clark, et al., "Live Migration of Virtual Machines", retrieved on Mar. 3, 2009 at <<http://www.cl.cam.ac.uk/research/srg/netos/papers/2005-migration-nsdi-pre.pdf>>, 14 pages.
"CLOC Count Lines of Code", retrieved on Mar. 3, 2009 at <<http://cloc.sourceforge.net/>>, Northrop Grummam Corporation / Information Technology / IT Solutions, 2006-2009, 15 pages.
Condit, et al., "Beta-Diversity in Tropical Forest Trees", retrieved on Mar. 3, 2009 at <<http://students.washington.edu/timbillo/readings%20fo%20peru/Condit%20et%20al.%20Science%202008%20beta%20diversity%20of%20tropical%20trees.pdf>>, Science 295, pp. 666-669, (2002).
Cox, et al., "A Safety-Oriented Platform for Web Applications", retrieved on Mar. 3, 2009 at <<http://www.cs.washington.edu/homes/gribble/papers/gribble-Tahoma.pdf>>, 15 pages.
"CVE-2003-0111", retrieved on Mar. 3, 2009 at <<http://cve.mitre.org/cgi-bin/cvename.cgi?name=CAN-2003-0111>>, Common Vulnerabilities and Exposures website, 2009, 1 page.
"CVE-2007-0043", retrieved on Mar. 3, 2009 at <<http://cve.mitre.org/cgi-bin/cvename.cgi?name=CVE-2007-0043>>, Common Vulnerabilities and Exposures website, 2009, 1 page.
"Debian Counting", retrieved on Mar. 3, 2009 at <<http://libresoft.dat.escet.urjc.es/debian-counting/>>, Grupo de Sistemas y Comunicaciones, Universidad Rey Juan Carlos, Mostoles, Madrid, Spain, 2004-2005, 1 page.
Douceur, et al., "Leveraging Legacy Code to Deploy Desktop Applications on the Web", retrieved on Mar. 3, 2009 at <<http://www.usenix.org/events/osdi08/tech/full_papers/douceur/douceur_html/index.html>>, Microsoft Research, pp. 1-21.
Erlingsson, et al., "XFI: Software Guards for System Address Spaces", retrieved on Mar. 3, 2009 at <<http://www.cs.ucsd.edu/~mvrable/papers/2006-osdi-xfi.pdf>>, Microsoft Research, Silicon Valley, pp. 1-14.
Ford, et al., "Vx32: Lightweight, User-level Sandboxing on the x86", retrieved on Mar. 3, 2009 at <<http://pdos.csail.mit.edu/papers/vx32:usenix08/>>, Massachusetts Institute of Technology, 20 pages.
Ford, et al., "VXA: A Virtual Architecture for Durable Compressed Archives", retrieved on Mar. 3, 2009 at <<http://pdos.csail.mit.edu/papers/vxa:fast05.pdf>>, Computer Science and Artificial Intelligence Laboratory, MIT, Mass., 14 pages.
Garfinkel, et al., "Ostia: A Delegating Architecture for Secure System Call Interposition", retrieved on Mar. 3, 2009 at <<http://www.isoc.org/isoc/conferences/ndss/04/proceedings/Papers/Garfinkel.pdf>>, Computer Science Department, Stanford University, CA., 15 pages.
Garfinkel, "Traps and Pitfalls: Practical Problems in System Call Interposition Based Security Tools", retrieved on Mar. 3, 2009 at <<http://www.stanford.edu/~talg/papers/traps/traps-ndss03.pdf>>, Computer Science Department, Stanford University, 14 pages.
Goldberg, et al., "A Secure Environment for Untrusted Helper Applications (Confining the Wily Hacker)", retrieved on Mar. 3, 2009 at <<http://www.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.
"Gears Improving Your Web Browser", retrieved on Mar. 3, 2009 at << http://gears.google.com/>>, Google 2008, 1 page.
Harren, et al., "Using Dependent Types to Certify the Safety of Assembly Code", retrieved on Mar. 3, 2009 at <<http://www.cs.berkeley.edu/~necula/Papers/deptypes_sas05.pdf>>, Static Analysis Symposium (SAS) 2005, pp. 155-170.
Jackson, et al., "Protecting Browser State from Web Privacy Attacks", retrieved on Mar. 3, 2009 at <<http://portal.acm.org/citation.cfm?id=1135884>>, WWW 2006, May 23-26, 2006, Edinburgh, Scotland, pp. 737-744.
Jobs, "Keynote Address", Apple Worldwide Developers Conference, Aug. 2006, 3 pages.
Kiciman, et al., "AjaxScope: A Platform for Remotely Monitoring the Client-Side Behavior of Web 2.0 Applications", retrieved on Mar. 3, 2009 at <<http://research.microsoft.com/en-us/projects/ajaxscope-sosp.pdf>>, SOSP 2007, Oct. 14-17, 2007, Stevenson, WA., 14 pages.
Kozuch, et al., "Internet Suspend/Resume", retrieved on Mar. 3, 2009 at <<http://www.intel-research.net/Publications/Pittsburgh/110620030912_88.pdf>>, Fourth IEEE Workshop on Mobile Computing Systems and Applications, Callicoon, NY, Jun. 2002, 8 pages.
"Live from CES: Hands on With Vista—Vista by the Numbers, A Developer Tells All", retrieved on Mar. 3, 2009 at <<http://ces.gearlive.com/cesblog/article/live-from-ces-hands-on-with-vistamdashvista-by-the-numbers-0108051321/>>, 5 pages.
Livshits, et al., "Doloto: Code Splitting for Network-Bound Web 2.0 Applications", retrieved on Mar. 3, 2009 at <<ftp://ftp.research.microsoft.com/pub/tr/TR-2007-159.pdf>>, Microsoft Research, pp. 1-25.
Lorch, et al., "The VTrace Tool: Building a System Tracer for Windows NT and Windows 2000", retrieved on Mar. 3, 2009 at <<http://msdn.microsoft.com/en-us/magazine/cc302289(printer).aspx>>, Microsoft Corporation 2009, 10 pages.
McCamant, et al., "Evaluating SFI for a CISC Architecture", retrieved on Mar. 3, 2009 at <<http://groups.csail.mit.edu/pag/pubs/pittsfield-usenix2006.pdf>>, pp. 1-16.
McIlroy, "Mass Produced Software Components", retrieved on Mar. 3, 2009 at <<http://www.dcs.gla.ac.uk/courses/teaching/mscweb/rrcs/papers/SE/McIlroy.pdf>>, 12 pages.
Morrisett, et al., "From System F to Typed Assembly Langauge", retrieved on Mar. 3, 2009 at <<http://www.cs.princeton.edu/~dpw/papers/tal-toplas.pdf>>, Mar. 1999, pp. 1-41.
"Mozilla: The browser as operating system", retrieved on Mar. 3, 2009 at <<http://www.mathewingram.com/work/2008/08/26/mozilla-the-browser-as-operating-system/>>, Aug. 26, 2008, 8 pages.
Necula, et al., "CCured: Type-Safe Retrofitting of Legacy Software", retrieved on Mar. 3, 2009 at <<http://www.eecs.berkeley.edu/~necula/Papers/ccured_toplas.pdf>>, ACM Transactions on Programming Languages and Systems, vol. 27, No. 3, May 2005, 48 pages.
Necuala, et al., "Safe Kernel Extensions Without Run-Time Checking", retrieved on Mar. 3, 2009 at <<http://citeseerx.ist.psu.edu/viewdoc/summary?doi=10.1.1.40.3010>>, Proceedings of the Second Symposium on Operating Systems and Implementation (OSDI 1196), Seattle, WA, Oct. 28-31, 1996, 15 pages.
"CWE—Common Weakness Enumeration", retrieved on Mar. 3, 2009 at <<http://nvd.nist.gov/cwe/cfm>>, National Vulnerability Database, NIST, 3 pages.

(56) References Cited

OTHER PUBLICATIONS

"Outsource Web Enabling your Legacy Applications to O2I", retrieved on Mar. 3, 2009 at <<http://www.outsource2india.com/software/LegacySystems.asp>>, Flatworld Solutions Company, 2008, 7 pages.
Provos, "Improving Host Security with System Call Policies", retrieved on Mar. 3, 2009 at <<http://www.citi.umich.edu/u/provos/papers/systrace.pdf>>, Center for Information Technology Integration, University of Michigan, 15 pages.
Puder, "Extending Desktop Applications to the Web", retrieved on Mar. 3, 2009 at <<http://www.puder.org/publications/dorea04.pdf>>, San Francisco State University, Computer Science Department, 6 pages.
Purdy, et al., "Google Chrome as Future Operating System", retrieved on Mar. 3, 2009 at <<http://lifehacker.com/5053069/google-chrome-as-future-operating-system>>, Sep. 22, 2008, 1 page.
Resig, "The Browser Operating System", retrieved on Mar. 3, 2009 at <<http://ejohn.org/blog/the-browser-operating-system/>>, Feb. 22, 2009, 5 pages.
Rinard, et al., "Enabling Server Availability and Security Through Failure—Oblivious Computing", retrieved on Mar. 3, 2009, at <<http://web.mit.edu/droy/www/papers/osdi04.pdf>>, Computer Science and Artificial Intelligence Laboratory, MIT, Mass., 14 pages.
Sabin, "Strace for NT", retrieved on Mar. 3, 2009, at <<http://www.securityfocus.com/tools/1276>>, SecurityFocus 2007, 1 page.
Sapuntzakis, et al., "Optimizing the Migration of Virtual Computers", retrieved on Mar. 3, 2009, at <<http://suif.stanford.edu/collective/osdi02-optimize-migrate-computer.pdf>>, Computer Science Department, Stanford University, 14 pages.
"Secunia Advisories: SA7587", retrieved on Mar. 3, 2009 at <<http://secunia.com/advisories/7587/>>, Secunia 2002-2009, 4 pages.
"Open Source Software", retrieved on Mar. 3, 2009 at <<http://sourceforge.net>>, SourceForge, Inc., 1999-2009, 1 page.
Swift, et al., "Improving the Reliability of Commodity Operating Systems", retrieved on Mar. 3, 2009 at <<http://nooks.cs.washington.edu/nooks-tocs.pdf>>, University of Washington, pp. 1-33.
"The Dojo Offline Toolkit", retrieved on Mar. 3, 2009 at <<http://dojotoolkit.org/offline>>, The Dojo Foundation, 3 pages.
Tridgell, "Efficient Algorithms for Sorting and Synchronization", retrieved on Mar. 3, 2009 at <<http://www.samba.org/~tridge/phd_thesis.pdf>>, Australian National University, Feb. 1999, 115 pages.
Tucker, et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
Wahbe, et al., "Efficient Software-Based Fault Isolation", retrieved on Mar. 3, 2009 at <<http://crypto.stanford.edu/cs155/papers/sfi.pdf>>, SIGOPS 1993/12/93/N.C., USA, pp. 203-216.
Waldspurger, "Memory Resource Management in VMware ESX Server", retrieved on Mar. 3, 2009 at <<http://www.waldspurger.org/carl/papers/esx-mem-osdi02.pdf>>, Proc. Fifth Symposium on Operating Systems Design and Implementation (OSDI 2002), Dec. 2002, pp. 1-14.
"What is JPC?", retrieved on Mar. 3, 2009 at <<http://www-jpc.physics.ox.ac.uk/>>, Oxford University, 2004-2007, 2 pages.
Whitaker, et al., "Danali: Lightweight Virtual Machines for Distributed and Networked Applications", retrieved on Mar. 3, 2009 at <<http://denali.cs.washington.edu/pubs/distpubs/papers/denali_usenix2002.pdf>>, University of Washington, 14 pages.
"Windows Driver Kit", retrieved on Mar. 3, 2009 at <<http://microsoft.com/whdc/devtools/wdk/default.mspx>>, Microsoft Corporation 2009, 2 pages.
"WineHQ", retrieved on Mar. 3, 2009 at <<http://www.winehq.org/>>, 3 pages.
Witchel, et al., "Mondrix: Memory Isolation for Linux using Mondriaan Memory Protection", retrieved on Mar. 3, 2009 at <<http://www.cag.lcs.mit.edu/scale/papers/mmp-sosp2005.pdf>>, SOSP 2005, Oct. 23-26, 2005, Brighton, UK, 14 pages.
U.S. Appl. No. 61/449,072, filed Mar. 3, 2011, entitled, "Library-Operating-System Packaging-Model Scenarios," 35 pages.
Translated Chinese Office Action mailed Jan. 26, 2016 for Chinese Patent Application No. 201280011551.7, a counterpart foreign application of U.S. Appl. No. 13/314,512, 12 pages.
Final Office Action, dated Dec. 14, 2015, for U.S. Appl. No. 13/314,512, 14 pgs.
Keetch, "Escaping from Protected Mode Internet Explorer," Verizon Business, retrieved at <<https://www.google.com/webhp?sourceid=chrome-instant&ion=1&espv=2&ie=UTF-8#q=keetch+escaping+from+protected+mode+internet+explorer+>>, 2009, 47 pages.
Lorch et al., "Building VTrace, a Tracer for Windows NT and Windows 2000", Univ of CA, Berkeley, Computer Science Div, Report No. UCB/CSD-00-1093, Feb. 2000, 18 pgs.
Mergen et al, "Virtualization for High-Performance Computing", ACM SIGOPS Operating Systems Review, vol. 40, Issue 2, Apr. 2006, 4 pgs.
Non-Final Office Action, dated Feb. 1, 2016, U.S. Appl. No. 13/331,078, 9 pgs.
Sapuntzakis et al, "Optimizing the Migration of Virtual Computers", Proc 5th Symposium on Operating Systems Design and Implementation, Dec. 2002, 14 pgs.
"Sun Bytecode Verifier Vulnerability", US Dept of Energy, Computer Incident Advisory Center, Information Bulletin, Mar. 2002, 5 pgs.
Taiwanese Office Action and Search Report mailed Nov. 18, 2015 for Taiwanese Patent Application No. 101112828, a counterpart foreign application of U.S. Appl. No. 13/314,512, 7 pages.
Allen, "Windows Vista Application Development Requirements for User Account Control Compatibility", retrieved from <<http://msdn.microsoft.com/en-us/library/bb530410.aspx>>, Jun. 2007, 59 pages.
"Amazon Elastic Compute Cloud (EC2)", maluke.com, accessible from http://www.maluke.com/blog/amazon-elastic-compute-cloud-ec2, obtained on Dec. 5, 2011, 2 pages.
Ammons et al., "Libra: A Library OS for a JVM in a Virtualized Execution Environment", In Proceedings of the 3rd International Conference on Virtual Execution Environments, Jun. 13-15, 2007, 11 pages.
Anderson, "The Case for Application-specific Operating Systems", In Proceedings of the 3rd Workshop on Workstation Operating Systems, Apr. 23-24, 1992, 3 pages.
Appavoo et al., "Providing a Linux API on the Scalable K42 Kernel", In Proceedings of the 2003 USENIX Annual Technical Conference, Jun. 9-14, 2003, 14 pages.
AWS CloudHSM, retrieved on Oct. 28, 2013, available at: http://aws.amazon.com/cloudhsm/, 5 pages.
Azab et al., "SICE: A Hardware-Level Strongly Isolated Computing Environment for x86 Multi-core Platforms", CCS'11, Oct. 17-21, 2011, Chicago, Illinois, 14 pages.
Bagchi, "On Reliable Distributed IPC/RPC Design for Interactive Mobile Applications", ACM, Bangkok Thailand, 2010, 6 pages.
Barham et al., "Xen and the Art of Virtualization", In Proceedings of the 19th ACM Symposium on Operating Systems Principles, Oct. 19-22, 2003, 14 pages.
Baumann et al., "The Multikernel: A New OS Architecture for Scalable Multicore Systems", In Proceedings of the 22nd ACM Symposium on Operating Systems Principles, Oct. 11-14, 2009, 15 pages.
Bershad et al., "Extensibility, Safety and Performance in the SPIN Operating System", Proceedings of the fifteenth ACM symposium on Operating systems principles, Published Date: Dec. 3, 1995, 17 pages.
Bhattiprolu et al., "Virtual Servers and Checkpoint/Restart in Mainstream Linux", SIGOPS Operating Systems Review, Jul. 2008, 10 pages.
Bugnion et al., "Disco: Running Commodity Operating Systems on Scalable Multiprocessors", ACM Transactions on Computer Systems, vol. 15, No. 4, Nov. 1997, 36 pages.

(56) References Cited

OTHER PUBLICATIONS

Celesti et al., "Improving Virtual Machine Migration in Federated Cloud Environments", Second International Conference on Evolving Internet, Published date: Sep. 20-25, 2010, 7 pages.
Chahal et al., "Testing Live Migration with Intel Virtualization Technology FlexMigration", Intel Information Technology, Jan. 2009, 12 pages.
Chang et al., "User-level Resource-constrained Sandboxing", USENIX-NT, Aug. 2000, 11 pages.
Charles, "Mark Russinovich: Inside Windows 7", retrieved at <<http://channel9.msdn.com/Shows/Going+Deep/Mark-Russinovich-Inside-Windows-7>>, Jan. 2009, 12 pages.
Chen et al., "Setuid Demystified", In Proceedings of the 11 th USENIX Security Symposium, Aug. 5-9, 2002, 20 pages.
Cheriton et al., "A Caching Model of Operating System Kernel Functionality", In Proceedings of the 1st USENIX Symposium on Operating Systems Design and Implementation, Nov. 1994, 15 pages.
Christodorescu et al., "Cloud Security is Not (Just) Virtualization Security", CCSW'09, Nov. 13, 2009, Chicago, Illinois, 6 pages.
Translated Chinese Office Action mailed Jan. 28, 2015 for Chinese patent application No. 201210537282.X, a counterpart foreign application of U.S. Appl. No. 13/323,562, 14 pages.
Translated Chinese Office Action mailed Nov. 30, 2015 for Chinese patent application No. 201210537282.X, a counterpart foreign application of U.S. Appl. No. 13/323,562, 6 pages.
Translated Chinese Office Action mailed Dec. 3, 2014 for Chinese patent application No. 201210533610.9, a counterpart foreign application of U.S. Appl. No. 13/323,465, 12 page.
Translated Chinese Office Action mailed Aug. 21, 2015 for Chinese patent application No. 201210533610.9, a counterpart foreign application of U.S. Appl. No. 13/323,465, 9 pages.
Eiraku et al., "Fast Networking with Socket Outsourcing in Hosted Virtual Machine Environments", In Proceedings of be 24th ACM Symposium on Applied Computing, Mar. 8-12, 2009, 8 pages.
Engler et al., "Exokernel: An Operating System Architecture for Application-level Resource Management", In Proceedings of the 15th ACM Symposium on Operating Systems Principles, Dec. 3-6, 1995, 16 pages.
European Office Action mailed May 27, 2015 for European patent application No. 12858489.3, a counterpart foreign application of U.S. Appl. No. 13/323,562, 5 pages.
European Office Action mailed Oct. 21. 2014 for European patent application No. 12858587.4, a counterpart foreign application of U.S. Appl. No. 13/323,465, 7 pages.
Supplementary European Search Report mailed May 7, 2015 for European Patent Application No. 12858489.3, 3 pages.
Supplementary European Search Report mailed Sep. 3, 2014 for European Patent Application No. 12858587.4, 3 pages.
Extended European Search Report mailed Oct. 27, 2014 for European Patent Application No. 12752531.9, 9 pages.
"Escaping from Microsoft's Protected Mode Internet Explorer— Evaluating a potential security boundary", retrieved at <<http://www.verizonbusiness.com/resources/whitepapers/wp_escapingmicrosoftprotectedmodeinternetexplorer_en_xg.pdf>>, White Paper, 2010, 8 pages.
Farsi, M., "CANOpen Communication", Proceedings of Drives and Controls, INSPEC Abstract Retrieved on-line from Dialog, Mar. 5-7, 1996, 1 Page.
Fischer, "Red Hat Enterprise Linux 4 Application Compatibility", retrieved from <<http://www.redhat.com/f/pdf/rhel4/AppCompat.pdf>>, Feb. 2005, 12 pages.
Final Office Action for U.S. Appl. No. 13/314,512, mailed on Jul. 15, 2014, Hunt, et al., 29 pages.
Final Office Action for U.S. Appl. No. 13/215,244, mailed on Sep. 26, 2014, Bond, et al., 17 pages.
Franke et al., "Fuss, Futexes and Furwocks: Fast Userlevel Locking in Linux", In Proceedings of the Ottawa Linux Symposium, Jul. 11-14, 2010, 19 pages.

Garfinkel et al., "Flexible OS Support and Applications for Trusted Computing", Proceedings of the 9th conference on Hot Topics in Operating Systems, May 2003, 6 pages.
Garfinkel et al., "Terra: A Virtual Machine-Based Platform for Trusted Computing", Proceedings of the nineteenth ACM symposium on Operating systems principles, Published Date: Oct. 22, 2003, 14 pages.
Garfinkel, "Traps and Pitfalls: Practical Problems in System Call Interposition Based Security Tools", In Proceedings of the Network and Distributed Systems Security Symposium, Feb. 6-7, 2003, 14 pages.
Gregg et al., "Overview of IBM zEnterprise 196 I/O subsystem with focus on new PCI Express infrastructure", International Business Machines Corporation, vol. 56 No. 1/2 Paper 8, 2012, 14 pages.
Gupta et al., "Difference Engine: Harnessing Memory Redundancy in Virtual Machines", In Proceedings of the 8th USENIX Symposium on Operating Systems Design and Implementation, Dec. 8-10, 2008, 14 pages.
Hac, A., "Network Time Slots Allocation by Using a Time Multiplexed Switch in a Telecommunications Architecture", Singapore ICCS '94, Nov. 14-18, 1994, pp. 1149-1153.
Helander, "Unix Under Mach: The Lites Server", Helsinki University of Technology, Helsinki, Dec. 30, 1994, 71 pages.
Howell et al., "Living Dangerously: A Survey of Software Download Practices", Microsoft Research, May 2010, 16 pages.
Hwang et al., "ATM-Based Plug-and-Play Technique for In-home Networking", Electronic Letters, Oct. 29, 1988, vol. 34, No. 22, pp. 2088-2090.
Intel Cloud Builder Guide, "Intel Cloud Builders Guide to Cloud Design and Deployment on Intel Platforms", www.intel.com/en_US/Assets/PDF/general/icb_ra_cloud_computing_Parallels_TCP.pdf, Retrieved Date: Dec. 7, 2011, 19 pages.
International Search Report for International Appl. No. PCT/US2012/027635 dated Oct. 30, 2012, 3 pages.
"Internet Information Services 7.5", Retrieved at <<http://technet.microsoft.com/en-us/library//dd364124(wa.10).aspx>>, Mar. 24, 2009, 3 pages.
International Search Report and Written Opinion for PCT Application PCT/US12/27635 dated Oct. 30, 2012, 7 pages.
Aaraj et al., "Energy and Execution Time Analysis of a Software-based Trusted Platform Module", IEEE, EDAA, 2007, 6 pages.
Durahim et al., " Implementing a Protected Zone in a Reconfigurable Processor for Isolated Execution of Cryptographic Algorithms", International Converence on Reconfigurable Computing and FPGAs, IEEE, 2009, 6 pages.
International Search Report and Written Opinion for PCT Application PCT/US2012/067662 dated Mar. 11 2013, 6 pages.
International Search Report and Written Opinion for PCT Application PCT/US2012/067660 dated Mar. 20, 2013, 4 pages.
International Search Report and Written Opinion for PCT Application PCT/US2015/038204 dated Sep. 4, 2015, 9 pages.
Karme, Anil, "Building YOURcloud: The Federal Government's first Secure Hybrid Community Cloud", retrieved on: October 30, 2013, available at: http://www.govmarkcouncil.com/presentations/event112912/Anil_Karmel.pdf, RightPath, 39 pages.
Karthik, P, et al., "A Secure Access Code Technique for Remote Data Integrity on Public Cloud", International Journal of Computer Applications, vol. 77, Issue14, Sep. 2013, pp. 26-31.
Ko et al., "TrustCloud: A Framework for Accountability and Trust in Cloud Computing", Published Jul. 8, 2011, 5 pages.
Kobayashi, et al., "Quick Reboot-based Recovery for Commodity Operating Systems in Virtualized Server Consolidation," Retrieved at <<http://eurosys2010-dev.sigops-france.fr/workshops/IIDS2010/iids2010_7.pdf>>, Feb. 2010, Association for Computing Machinery, 6 pages.
Leslie et al, "The Design and Implementation of an Operating System to Support Distributed Multimedia Applications", IEEE Journal on Selected Areas in Communications, May 1996, 18 pages.
LeVasseur et al., "Pre-Virtualization: Slashing the Cost of Virtualization", University of Karlsruhe, Germany, IBM, T. J. Watson Research Center, New York National ICT, Australia University of New South Wales, Australia, Nov. 2005.

(56) References Cited

OTHER PUBLICATIONS

Litzkow et al., "Checkpoint and Migration of UNIX Processes in the Condor Distributed Processing System", University of Wisconsin Madison, Apr. 1997, 9 pages.
Loscocco et al., "Integrating Flexible Support for Security Policies into the Linux Operating System", In Proceedings of the 2001 USENIX Annual Technical Conference, Feb. 2001, 62 pages.
Love, "Get on the D-BUS", Linux Journal, accesible from http://www.ee.ryerson.ca/~courses/coe518/LinuxJournal/elj2005-130-D-BUS.pdf, obtained on Jun. 18, 2006, 5 pages.
Malan et al., "DOS as a Mach 3.0 Application", In Proceedings of the USENIX Mach Symposium, Nov. 1991, 14 pages.
Mallipeddi et al., "Ensemble Strategies in Compact Differential Evolution", 2011 IEEE Congress of Evolutionary Computation, CEC 2011, Jun. 5-6, 2011, pp. 1972-1977.
Marosi et al., "Using VirtualMachines in Desktop Grid Clients for Application Sandboxing", CoreGRID Technical Report, No. TR-140, Aug. 31, 2008, 13 pages.
Masti, et al.,"An Architecture for Concurrent Execution of Secure Environments in Clouds", In Proceedings of in the ACM Cloud Computing Security Workshop , Nov. 8, 2013, 12 pages.
McKeen, et al., "Innovative Instructions and Software Model for Isolated Execution" In Proceedings of the 2nd International Workshop on Hardware and Architectural Support for Security and Privacy, Jun. 24, 2013, 8 pages.
Microsoft Corp, "Internet Information Services 7.5", retrieved at <<http:technet.microsoft.com/en-us/library/dd364124 (v=ws.10).aspx>>, Mar. 2009, 2 pages.
Microsoft Press, "Microsoft Computer Dictionary, 5th Edition", One Microsoft Way, Redmond, WA, Copyright 2002, 648 pages.
Microsoft, "Microsoft Application Virtualization (App-V)", accessible from http://www.microsoft.com/en-us/windows/enterprise/products-and-technologies/virtualization/app-v.aspx, obtained on Dec. 7, 2011, 2 pages.
Microsoft, "Performance Tuning Guidelines for Windows Server 2008 R2", Redmond, WA, May 16, 2011, 118 pages.
Microsoft, "Remote Desktop Protocol: Basic Connectivity and Graphics Remoting Specification", Redmond, WA, release: Sep. 20, 2011, 417 pages.
Microsoft-TechNet.com, "Device Management and Installation Step-by-Step Guide: Signing and Staging Defvice Drivers in Windows 7 and Windows Server 2008 R2" retrieved Aug. 19, 2012.
Mihocka et al., "Virtualization without direct execution or jutting: designing a portable virtual machine infrastructure", retrieved at bochs.sourcheforge.net/Virtualization_Without—Hardware_Final.PDF, Jun. 21, 2008, 16 pages.
NPL Search Results U.S. Appl. No. 13/196,235, Elsevier Eng. Info. Inc., 2013, 23 pages.
Office Action dated Jun. 10, 2013 for related matter U.S. Appl. No. 13/107,973, Bond et al., "Instruction Set Emulation for Guest Operating Systems".
Office action for U.S. Appl. No. 13/107,973, mailed Jun. 10, 2013, Bond, "Instruction Set Emulation for Guest Operating Systems", 14 pages.
Office action for U.S. Appl. No. 12/972,081, mailed on Sep. 10, 2013, Douceur, et al., "Application Compatibility Shims for Minimal Client Computers", 18 pages.
Office action for U.S. Appl. No. 13/323,465, mailed on Sep. 13, 2013, Baumann, et al., "Cryptographic certification of Secure Hosted Execution Environments", 15 pages.
Office action for U.S. Appl. No. 13/372,390, mailed on Sep. 19, 2013, Baumann, et al., "Cryptographic Certification of Secure Hosted Execution Environments", 20 pages.
Office action for U.S. Appl. No. 13/215,244 , mailed on Oct. 1, 2015, Bond et al., "Migration of Cloud Applications Between a Local Computing Device and Cloud", 20 pages.
Office action for U.S. Appl. No. 13/196,235, mailed on Oct. 15, 2013, Douceur, et al., "Constraining Execution of Specified Device Drivers ", 29 pages.
Office action for U.S. Appl. No. 13/323,562, mailed on Oct. 23, 2013, Baumann, et al., "Facilitating System Service Request Interactions for Hardware-Protected Applications", 16 pages.
Office action for U.S. Appl. No. 13/107,973, mailed Oct. 25, 2013, Bond, "Instruction Set Emulation for Guest Operating Systems", 12 pages.
Office action for U.S. Appl. No. 13/196,235, mailed on Nov. 21, 2014, Douceur, et al., "Constraining Execution of Specified Device Drivers ", 30 pages.
Office Action for U.S. Appl. No. 12/834,895, mailed on Nov. 6, 2012, Hunt, et al., "Ultra-Low Cost Sandboxing for Application Appliances", 19 pages.
Office Action for U.S. Appl. No. 13/345,031, mailed on Nov. 6, 2013, Hunt, et al., "Dynamic Application Migration", 8 pages.
Office action for U.S. Appl. No. 12/463,892, mailed on Dec. 6, 2011, Howell, J.R., "Executing Native-Code Applications in a Browser", 26 pages.
Office action for U.S. Appl. No. 13/372,390, mailed on Dec. 19, 2014, Baumann, et al., "Cryptographic Certification of Secure Hosted Execution Environments", 23 pages.
Office Action dated Dec. 21, 2012 for related matter 332238.01.
Office Action dated Dec. 21, 2012 for related matter U.S. Appl. No. 13/107,973, Bond et al., "Instruction Set Emulation for Guest Operating Systems".
Office action for U.S. Appl. No. 13/107,973, mailed Dec. 21, 2014, Bond, "Instruction Set Emulation for Guest Operating Systems", 12 pages.
Office action for U.S. Appl. No. 13/331,078, mailed on Dec. 22, 2014, Hunt, et al., "Lightweight On-Demand Virtual Machines", 7 pages.
Office action for U.S. Appl. No. 13/215,244, mailed on Feb. 23, 2015, Bond, et al., "Migration of Cloud Application Between a Local Computing Device and Cloud", 20 pages.
Office Action for U.S Appl. No. 13/215,244, mailed on Feb. 28, 2014 for Bond, et al., "Migration of Coud Applications Between a Local Computing Device and Cloud," 15 pages.
Office action for U.S. Appl. No. 13/372,390, mailed on Mar. 12, 2013, Baumann et al., "Cryptographic Certification of Secure Hosted Execution Environments", 17 pages.
Office action for U.S. Appl. No. 13/323,465, mailed on Mar. 12, 2014, Baumann et al., "Cryptographic Certification of Secure Hosted Execution Environments", 20 pages.
Office action for U.S. Appl. No. 13/196,235, mailed on Mar. 17, 2015, Douceur et al., "Constraining Execution of Specified Device Drivers", 33 pages.
Office action for U.S. Appl. No. 13/323,465, mailed on Mar. 26, 2015, Baumann et al., "Cryptographic Certification of Secure Hosted Execution Environments", 27 pages.
Office Action for U.S. Appl. No. 12/834,895, mailed on Apr. 30, 2013, Hunt, et al., "Ultra-Low Cost Sandboxing for Application Appliances", 23 pages.
Office action for U.S. Appl. No. 12/972,081, mailed on Apr. 5, 2013, Douceur et al., "Application Compatibility Shims for Minimal Client Computers", 14 pages.
Office action for U.S. Appl. No. 12/972,081, mailed on Apr. 7, 2014, Douceur et al., "Application Compatibility Shims for Minimal Client Computers", 27 pages.
Office action for U.S. Appl. No. 13/196,235, mailed on Apr. 8, 2013, Douceur et al., "Constraining Execution of Specified Device Drivers ", 25 pages.
Office action for U.S. Appl. No. 13/196,235, mailed on Apr. 9, 2014, Douceur et al., "Constraining Execution of Specified Device Drivers ", 34 pages.
Office Action for U.S. Appl. No. 13/107,973, mailed May 21, 2014, for Bond, et al., "Instruction Set Emulation for Guest Operating Systems," 14 pages.
Office action for U.S. Appl. No. 13/323,562, mailed on May 8, 2013, Baumann et al., "Facilitating System Service Request Interactions for Hardware-Protected Applications", 13 pages.
Office Action for U.S. Appl. No. 13/314,512, mailed on Jun. 25, 2015, Hunt et al., "Application Compatibility with Library Operating Systems", 12 pages.

(56) References Cited

OTHER PUBLICATIONS

Office action for U.S. Appl. No. 13/314,512, mailed on Jul. 15, 2014, Hunt, et al., "Application Compatibility with Library Operating Systems", 29 pages.
Office Action for U.S. Appl. No. 13/331,078, mailed on Jul. 16, 2015, Hunt et al., "Lightweight On-Demand Virtual Machines", 10 pages.
Office action for U.S. Appl. No. 13/323,465, mailed on Jul. 22, 2015, Baumann et al., "Cryptographic Certification of Secure Hosted Execution Environments", 29 pages.
Office action for U.S. Appl. No. 13/372,390, mailed on Jul. 22, 2015, Baumann et al., "Cryptographic Certification of Secure Hosted Execution Environments", 24 pages.
Non-Final Office Action for U.S. Appl. No. 13/196,235, mailed on Jul. 3, 2014, Douceur et al., "Constraining Execution of Specified Device Drivers ", 31 pages.
Office Action for U.S. Appl. No. 13/314,512, mailed on Jul. 30, 2013, Hunt, et al., "Application Compatibility with Library Operating Systems", 19 pages.
Office action for U.S. Appl. No. 13/196,235, mailed on Sep. 22, 2015, Douceur et al., "Constraining Execution of Specified Device Drivers", 36 pages.
Parno, et al., "Memoir Practical State Continuity for Protected Modules", Proceedings of the IEEE Symposium on Security and Privacy, May 2011, 16 pages.
Porter et al., "Rethinking the Library OS from the Top Down", ASPLOS' 11, Mar. 5-11, 2011, Newport Beach, California, 15 pages.
Portoles et al., "IEEE 802.11 Downlink Traffic Shaping Scheme for Multi-User Service Enhancement", 14th IEEE 2003 International Symposium on Personal, Indoor and Mobile Radio Communications, PIMRC2003, Sep. 9-10, 2003, pp. 1712-1716.
Price et al., "Solaris Zones: Operating System Support for Server Consolidation", In Proceedings of the Large Installation Systems Administration Conference, Nov. 2004, 2 pages.
Quinn et al., "Neutron Sensitivity of High-Speed Networks", IEEE Transactions on Nuclear Science, vol. 57, No. 6, Dec. 2010, pp. 3547-3552.
Roscoe et al., "Hype and Virtue", In Proceedings of the 11th USENIX Workshop on Hot Topics in Operating Systems, Aug. 2007, 6 pages.
"Safenet Hardware Security Modules (HSMs)", Retrieved on Oct. 31, 2013, available at: http://www.safenet-inc.com/products/data-protection/hardware-security-modules-hsms/, 8 pages.
Sahita, et al., "Beyond Ring-3: Fine Grained Application Sandboxing", W3C Workshop on Secutiy for Access to Device APIs from the Web, Dec. 2008, 5 pages.
Sapuntzakis et al., "Virtual Appliances for Deploying and Maintaining Software", In Proceedings of the Large Installation Systems Administration Conference, Oct. 2003, 15 pages.
Sedayao, Jeff, "Enhancing Cloud Security Using Data Anonymization", In white Paper of Intel, Jun. 2012, 8 pages.
Smith, Roderick W., "Using QEMU for cross-platform development", retrieved at www.ibm.com/developerworks/linux/library/l-qemu-development/?ca=drs-, Feb. 9, 2010, 7 pages.
Soltesz et al., "Container-based Operating System Virtualization: A Scalable, High-performance Alternative to Hypervisors", In Proceedings of the 2nd ACM SIGOPS/EuroSys European Conference on Computer Systems, Mar. 21-23, 2007, 13 pages.
Spear et al., "Solving the Starting Problem: Device Drivers as Self-describing Artifacts", In Proceedings of the EuroSys 2006 Conference, Apr. 18-21, 2006, 13 pages.
Sugerman et al., "Virtualizing I/O Devices on VMware Workstations Hosted Virtual Machine Monitor", In Proceedings of the 2001 USENIX Annual Technical Conference, Jun. 25-30, 2001, 15 pages.
Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.
Szefer et al., "Eliminating the Hypervisor Attack Surface for a More Secure Cloud", published Oct. 17-21, 2011, CCS'11, 12 pages.
Ta-Min et al., "Splitting Interfaces: Making Trust between Applications and Operating Systems Configurable", Proceedings of the 7th symposium on Operating systems design and implementation, Published Date: Nov. 2006, 14 pages.
Tan, et al. "iKernel: Isolating Buggy and Malicious Device Drivers Using . . . ", SlideShare, Inc., rProceedings of the Third IEEE International Symposium on Dependable, Autonomic and Secure Computing (DASC 07) 2007, 7 pages.
Tanaka, H., "Run-time Updating of Network Device Drivers", NBiS 2009—12th International Conference on Network-Based Information Systems, Aug. 19-21, 2009, pp. 446-450.
"Thoughts on Intel's upcoming Software Guard Extensions (Part 2)", published on: Sep. 23, 2013, available at: http://sec.soup.io/post/348921006/Thoughts-on-Intels-upcoming-Software-Guard-Extensions, 8 pages.
Vaarala, S., "Security Considerations of Commodity x86 Virtualization", Helsinki University of Technology, Telecommunications Software and Multimedia Laboratory, May 22, 2006.
Vaughan-Nichols, "New Approach to Virtualization Is a Lightweight," retrieved at <<http://ieeexplore.ieee.org/stamp/stamp.jsp?tp=&arnumber=4014757>>, IEEE, Computer, vol. 39, Issue 11, Nov. 2006, pp. 12-14.
Verizon Wireless, "Escaping from Microsoft Protected Mode Internet Explorer Evaluating a Potential Security Boundary", White Paper, Nov. 2011, 8 pages.
VMWare ThinApp, "Application Virtualization Made Simple", accessible from http://www.vmware.com/products/thinapp/overview.html, data sheet obtained on Aug. 29, 2012, 2 pages.
Waldspurger, "Memory Resource Management in VMware ESX Server", In Proceedings of the 5th USENIX Symposium on Operating Systems Design and Implementation, Dec. 2002, 14 pages.
Wang et al., "Protection and Communication Abstractions for Web Browsers in MashupOS", SOS, 2007, 15 pages.
"What Is Apple's New Secure Enclave and Why Is It Important?", published on: Sep. 18, 2013, available at: http://www.forbes.com/sites/quora/2013/09/18/what-is-apples-new-secure-enclave-and-why-is-it-important/2/, 5 pages.
Whitaker et al., "Scale and Performance in the Denali Isolation Kernel", In Proceedings of the 5th USENIX Symposium on Operating Systems Design and Implementation, Dec. 9-11, 2002, 15 pages.
Wood, et al., "CloudNet: Dynamic Pooling of Cloud Resources by Live WAN Migration of Virtual Machines", VEE'11, Mar. 9-11, 2011, Newport Beach, California, 12 pages.
Yee et al., "Native Client: A Sandbox for Portable, Untrusted x86 Native Code", In Proceedings of the 30th IEEE Symposium on Security and Privacy, May 17-20, 2009, 15 pages.
Yu et al., "A Feather-weight Virtual Machine for Windows Applications", VEE'06, 2006, 11 pages.
Zeldovich et al., "Making Information Flow Explicit in Histar", In Proceedings of the 8th USENIX Symposium on Operating Systems Design and Implementation, Nov. 2006, 16 pages.
Zhou et al., "Flexible On-Device Service Object Replication with Replets", In the Proceedings of the 13th International Conference on World Wide Web, May 17, 2004, pp. 131-142.
Translated Chinese Office Action mailed Feb. 26, 2016 for Chinese Patent Application No. 201210533610.9, a counterpart foreign application of U.S. Appl. No. 13/323,465, 6 pages.
Brickell, et al. "Direct Anonymous Attestation," Proceedings of the 11th ACM Conference on Computer and Communications Security, ACM, Feb. 2004, 28 pages.
The Chinese Office Action mailed Aug. 11, 2016 for Chinese patent application No. 201210533610.9, a counterpart foreign application of U.S. Pat. No. 9,413,538.
Final Office Action mailed Apr. 5, 2016 from U.S. Appl. No. 13/215,244, 23 pages.
International Preliminary Report on Patentability mailed Jun. 26, 2014 from PCT Patent Application No. PCT/US2012/067660, 6 pages.

(56) References Cited

OTHER PUBLICATIONS

International Preliminary Report on Patentability mailed Jun. 26, 2014 from PCT Patent Application No. PCT/US2012/06772, 8 pages.
International Preliminary Report on Patentability mailed Sep. 12, 2013 from PCT Application No. PCT/US2012/027635, 6 pages.
The Mexican Office Action mailed Aug. 2, 2016 for Mexican patent application No. MX/a/2014/007102, a counterpart foreign application of U.S. Pat. No. 9,389,933, 2 pages.

* cited by examiner

EXECUTING NATIVE-CODE APPLICATIONS IN A BROWSER

BACKGROUND

Developers have spent decades developing an abundance of desktop applications for execution on local machines of users. These applications include word processors, drawing applications, games and countless others. Since the development of many of these applications, however, users have begun to desire applications that are made available over a network (e.g., the Internet) rather than simply on a local machine of the user.

Because of this desire, developers have now begun the task of providing the functionality of previously-written desktop applications over the Web. Unfortunately, developers wrote many or all of these desktop applications in a type-unsafe language, such as C or C++. Based in large part on security concerns, the code of these applications typically cannot execute safely within a browser and, hence, has by and large not been made available for consumption over the Web. Instead, some developers have simply begun re-writing desktop applications (or applications similar to the previously-written desktop applications) in a type-safe language that a browser may utilize.

While re-writing applications for deployment over the Web may make sense in some circumstances, this strategy requires enormous monetary and time resources and fails to leverage the work that developers have already completed over the past several decades.

SUMMARY

Techniques for leveraging legacy code to deploy native-code desktop applications over a network (e.g., the Web) are described herein. These techniques include executing an application written in native code within a memory region that hardware of a computing device enforces. For instance, page-protection hardware (e.g., a memory management unit) or segmentation hardware may protect this region of memory in which the application executes. The techniques may also provide a narrow system call interface out of this memory region by dynamically enforcing system calls made by the application. Furthermore, these techniques may enable a browser of the computing device to function as an operating system for the native-code application. These techniques thus allow for execution of native-code applications on a browser of a computing device and, hence, over the Web in a resource-efficient manner and without sacrificing security of the computing device.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 4 further illustrates that the browser of the computing device may provide these system services and, hence, may function as an operating system for the application.

DETAILED DESCRIPTION

Figure 1:
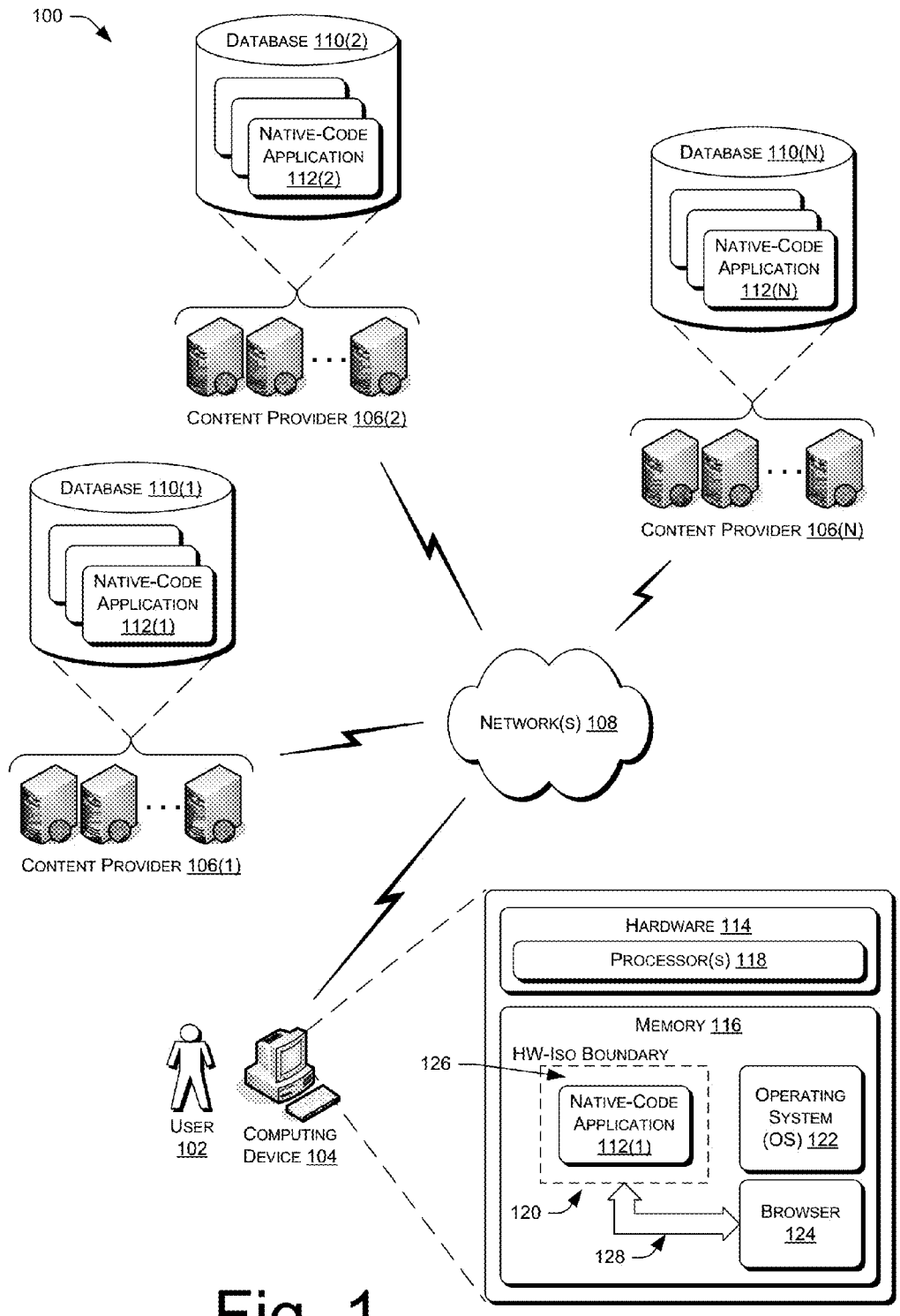
FIG. 1 illustrates an example computing architecture including multiple content providers that host native-code applications and a client computing device that a user operates. Within this architecture, the user may execute a native-code application on a browser of the client computing device in a secure and efficient manner.

The disclosure describes techniques for enabling users to safely and efficiently execute applications written in potentially unsafe and potentially un-trusted code on browsers of client computing devices. For instance, a user may send a request to execute a particular native-code application over a network, such as the Web, to a server that hosts the application. In response to the request, the server may serve native code of the application to the computing device of the user. The computing device may then assign a portion of memory to the received native code. In some instances, hardware of the computing device enforces reads and writes made by the application from this portion of the memory. For instance, page-protection hardware (e.g., a memory management unit), segmentation hardware, or another type of hardware may enforce the portion of memory that the computing device assigns to the native-code application.

After assigning the portion of memory to the native code, this code may safely execute within this portion of memory. Because the computing device comes equipped with the hardware that enforces this memory region, the native code may execute without placing an additional burden on the computing device. That is, the hardware enforcing the memory performs this function in parallel to the executing of the application and, hence, does not place a significant speed penalty on the execution of the application.

In addition, the techniques described herein provide a secure interface that allows the native-code application to make calls for system services. To do this in a secure manner, the techniques prevent the application (and its un-trusted code) from making calls through the standard system call (sys call) interface. Additionally, the techniques only allow the application to call a much narrower interface. This narrow interface dynamically enforces the system calls and, for calls that the interface deems permissible, passes the system calls on to a browser of the computing device on which the application runs. As such, this interface prevents the application from calling an underlying operating system (OS) of the computing device and, in lieu of the OS, enables the browser to function as the OS for the native-code application.

By bounding this native-code application into a region of memory protected by hardware of the computing device, the described techniques ensure that this application does not gain access to memory outside of this region (e.g., to the kernel of the computing device). Additionally and as noted above, because the computing device already includes the hardware enforcing this memory and because this hardware already performs this function, the described techniques efficiently enforce the memory protection without placing a speed penalty on the application.

Furthermore, by providing a narrow interface that only passes certain predefined specified commands outside of the memory region, the native code is unable to issue potentially malicious instructions to the operating system. Next, by routing system calls made by the application to the browser, the techniques enable the browser to provide existing services to the application and, hence, enable the browse to function as the operating system for the native code application with little or no modification to the browser. As a result, the techniques facilitate the running of native-code applications in an exceedingly efficient manner that is as secure as other functions performed by the browser. Finally and as discussed below, the techniques necessitate only slight modifications to the native-code applications for the applications to execute as explained above.

The discussion begins with a section entitled "Example Computing Architecture," which describes one non-limiting environment that may implement the described techniques. This section also pictorially illustrates a process of deploying a native-code application for execution within a browser of a computing device. Next, a section entitled "Example Computing Device" and its numerous sub-sections illustrate and describe additional components that may be used to implement the described techniques in some implementations. A third and final section, entitled "Example Process", describes an example process for deploying native-code applications over a network, such as the Web.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement the described techniques for leveraging legacy code to deploy native-code desktop applications over a network (e.g., the Web). The architecture 100 includes a user 102 operating a computing device 104 to access one or more content providers 106(1), 106(2), . . . , 106(N) over a network 108. As illustrated, each of the content providers 106(1)-(N) includes a respective database 110(1), 110(2), . . . , 110(N) that stores or otherwise has access to a respective set of one or more applications 112(1), 112(2), . . . , 112(N) that are written in native code. This native code may comprise, for instance, code of a type-safe language and/or a type-unsafe language (e.g., C, C++, etc).

Here, the user 102 operating the computing device 104 accesses a content provider (e.g., the content provider 106 (1)) over the network 108 to access an application (e.g., the application 112(1)) written in native code. This application may comprise a word processing application, a drawing application, a game, or any other type of application. The network 108 is representative of any one or combination of multiple different types of networks, interconnected with each other and functioning as a single large network (e.g., the Internet or an intranet). The network 108 may include wire-based networks (e.g., cable) and wireless networks (e.g., cellular, satellite, etc.). The network 108 may use any number of protocols and configurations to enable the computing device 104 to access other devices and resources.

The computing device 104 of the user 102, meanwhile, may comprise a personal computer, a laptop computer, a thin client, a mobile telephone, a portable music player or any other sort of suitable computing device. As illustrated, the computing device 104 here comprises a personal computer that includes hardware 114 and memory 116, which resides upon hardware 114. The hardware 114 may include some or all hardware traditionally found in a computing device, such as one or more processors 118 as well as hardware configured to enforce memory isolation boundaries and configured to enforce requests for reads and writes from applications executing within the boundaries. This hardware may comprise page-protection hardware (e.g., a memory management unit), segmentation hardware (i.e., segment registers) or any other hardware configured to enforce memory isolation boundaries and requested reads and writes.

As illustrated, the memory 116 of the computing device 104 includes a hardware-isolation boundary 120, enforced by a component of the hardware 114. The memory also includes an operating system 122 as well as a browser 124 that enables the user 102 to access the content provider 106(1) over the network 108.

In response to sending a request (e.g., via the browser 124) to the content provider 106(1) to execute the native-code application 112(1), the content provider 106(1) provides a portion or all of the application to the device 104 of the user 102. As illustrated, the device 104 then assigns a portion of memory 126—bounded by the hardware-isolation boundary 120—to the native-code application 112(1). Because the boundary 120 contains the application 112(1), the application is unable to access memory outside of the assigned portion of memory 126. As such, the application is unable to perform malicious acts outside of this area and, hence is unable to seriously harm the device 104 of the user 102.

Furthermore, because the hardware 114 of the device enforces this memory region in which the application executes, and because this hardware 114 already performs this type of task, the cost of this security is extremely low.

In addition to containing the native-code application 112(1) within the assigned portion of memory 126, the computing device 104 also provides a narrow interface 128 between the portion of memory 126 and the browser 124. This narrow interface 128 functions to block all but a few system calls made by the application 112(1). Furthermore, when the application makes a proper system call, the interface (and additional components described with reference to FIG. 2) route these calls to the browser 124. As such, the browser 124 is able to provide the requested services and is able to function as an operating system for the native-code application 112(1).

As the reader appreciates, the narrow interface 128 thus provides security to the computing device 104 by disallowing calls to any place other than the browser 124. As such, the native-code application 112(1) is unable to access trusted areas of the device 104 and is unable to seriously harm the computing device 104. In fact, because the described techniques enable the native-code application 112(1) to execute with use of existing services provided by the browser 124, in some instances these techniques require that no additional functionality be added to the browser 124. Also for this reason, the techniques provide security that is no less secure than operations typically performed by the browser 124 (e.g., accessing a website, running Flash objects, etc.).

Taken together, the architecture 100 of FIG. 1 enables a user 102 to access a native-code application 112 over the network 108 and execute the application on a local device 104 of the user 102. These techniques contain the application in a hardware-enforced region of memory 126 and provide a narrow interface 128 that only allows the application 112(1) to run within a browser 124 of the device 104. As such, these techniques enable content providers 106(1)-(N) to deploy applications that have been years and decades in the making over the web in a secure manner and, as discussed below, with only slight modifications to the deployed applications.

Figure 2:
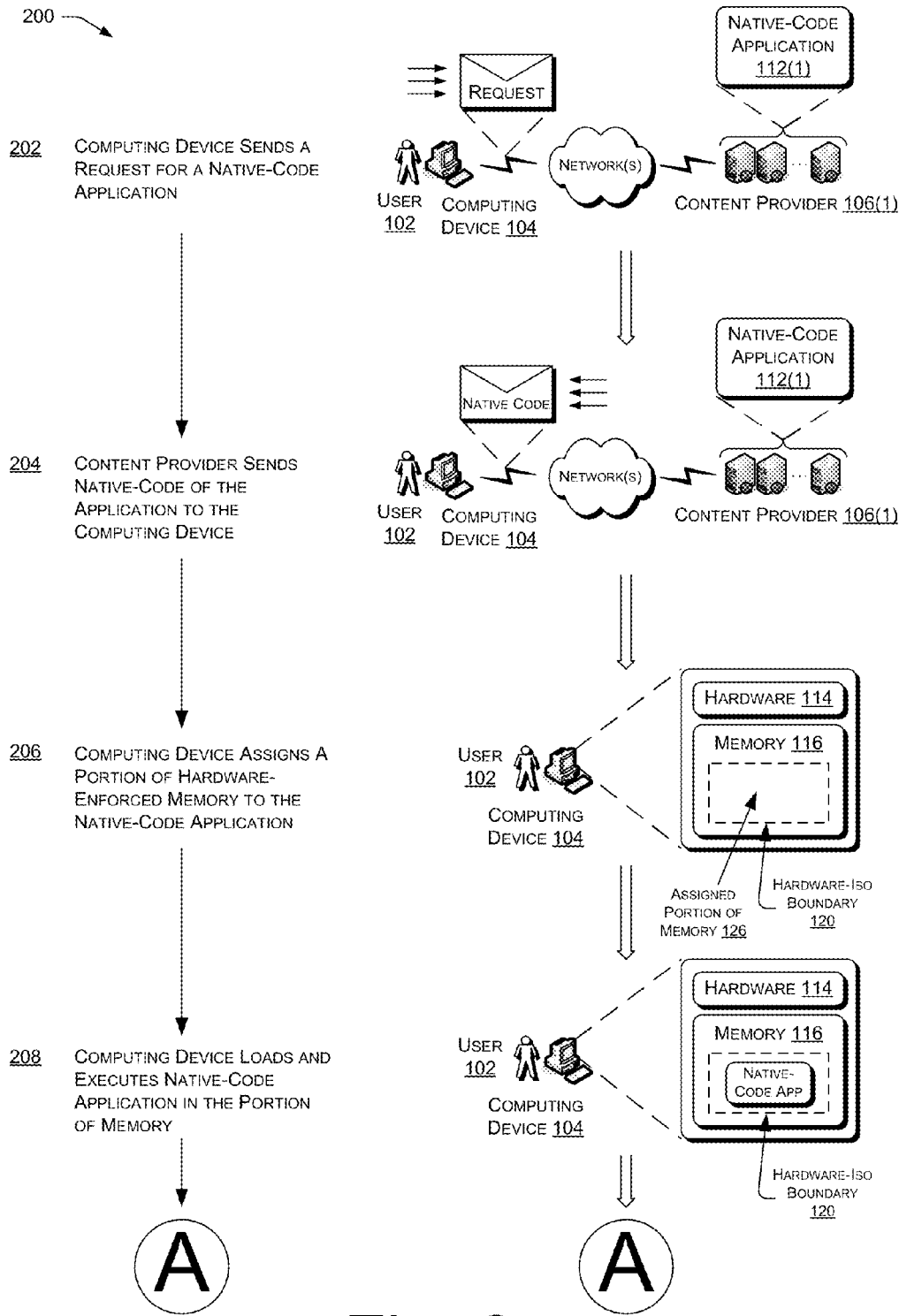
FIGS. 2-3 comprise a flow diagram illustrating an example process for enabling secure and efficient deployment of native-code applications over a network, such as the Web, utilizing the computing device architecture of FIG. 1.
Figure 3:
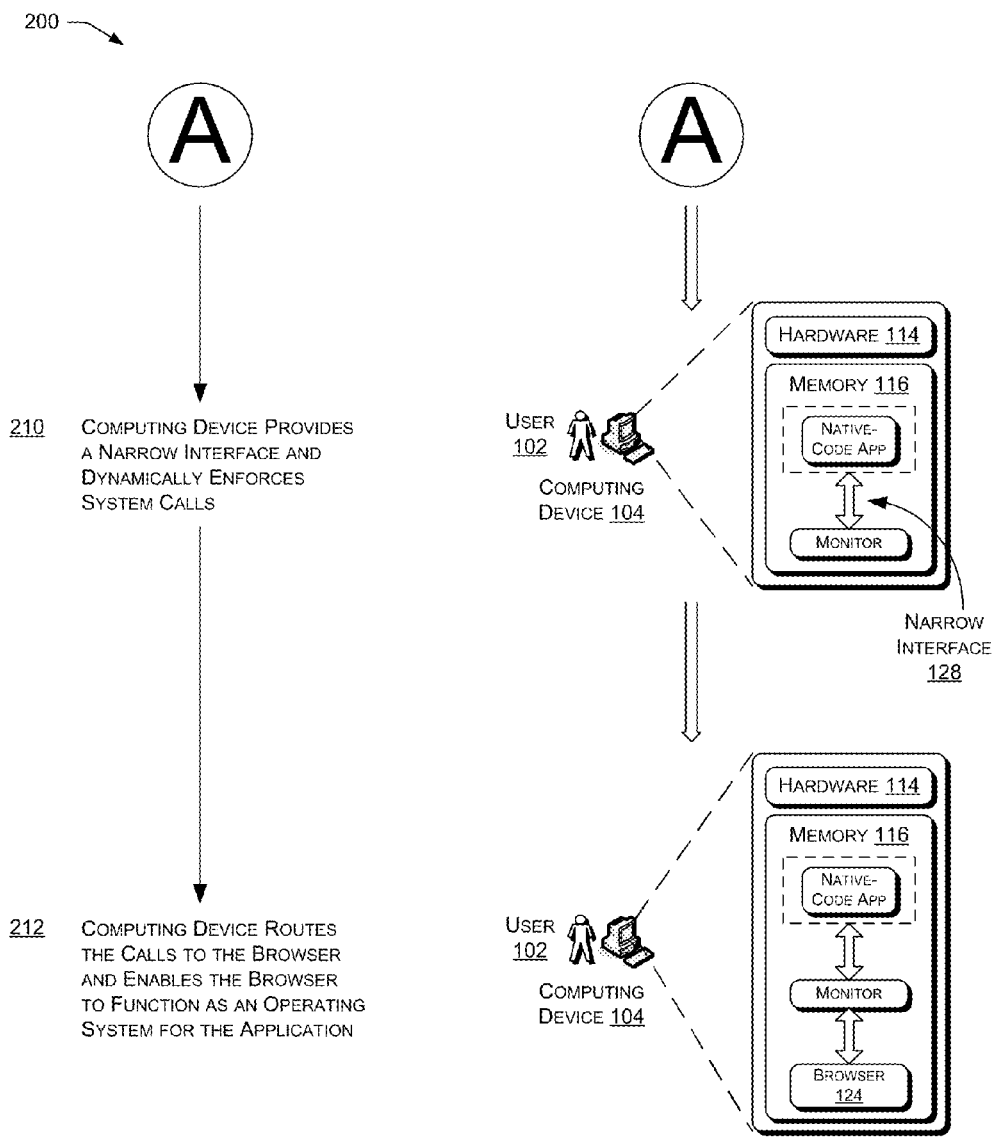

Having described one of many architectures that may employ the described techniques, FIGS. 2-3 illustrate an example process 200 for deploying native-code applications.

The process 200 includes a computing device 104 of the user 102 sending a request for a native-code application 112(1) to a content provider 106(1) over a network 108 at an operation 202. At an operation 204, the content provider 160(1) sends native code of the application 112(1) to the computing device 104 in response to receiving the request. Next, at an operation 206, the computing device 104 assigns a portion of memory 126 that is enforced by hardware 114 to the native-code application 112(1). The computing device 104 then loads and executes the native-code application 112(1) in the assigned portion of memory 126 at an operation 208.

FIG. 3 continues the illustration of the process 200. At an operation 210 the computing device 104 provides a narrow interface 128 to the native-code application 112(1). This narrow interface dynamically enforces system calls made by the application. When the application 112(1) makes a proper call to the interface 128, the interface routes the call to a monitor (described in detail below), which in turn routes the call to a browser 124 of the device 104 at an operation 212. By receiving these calls and providing existing browser services to the application, the browser is able to function as an operating system for the application 112(1).

With this process 200 in mind, the following section describes in more detail an example computing device to implement the described techniques.

Example Computing Device

Figure 4:
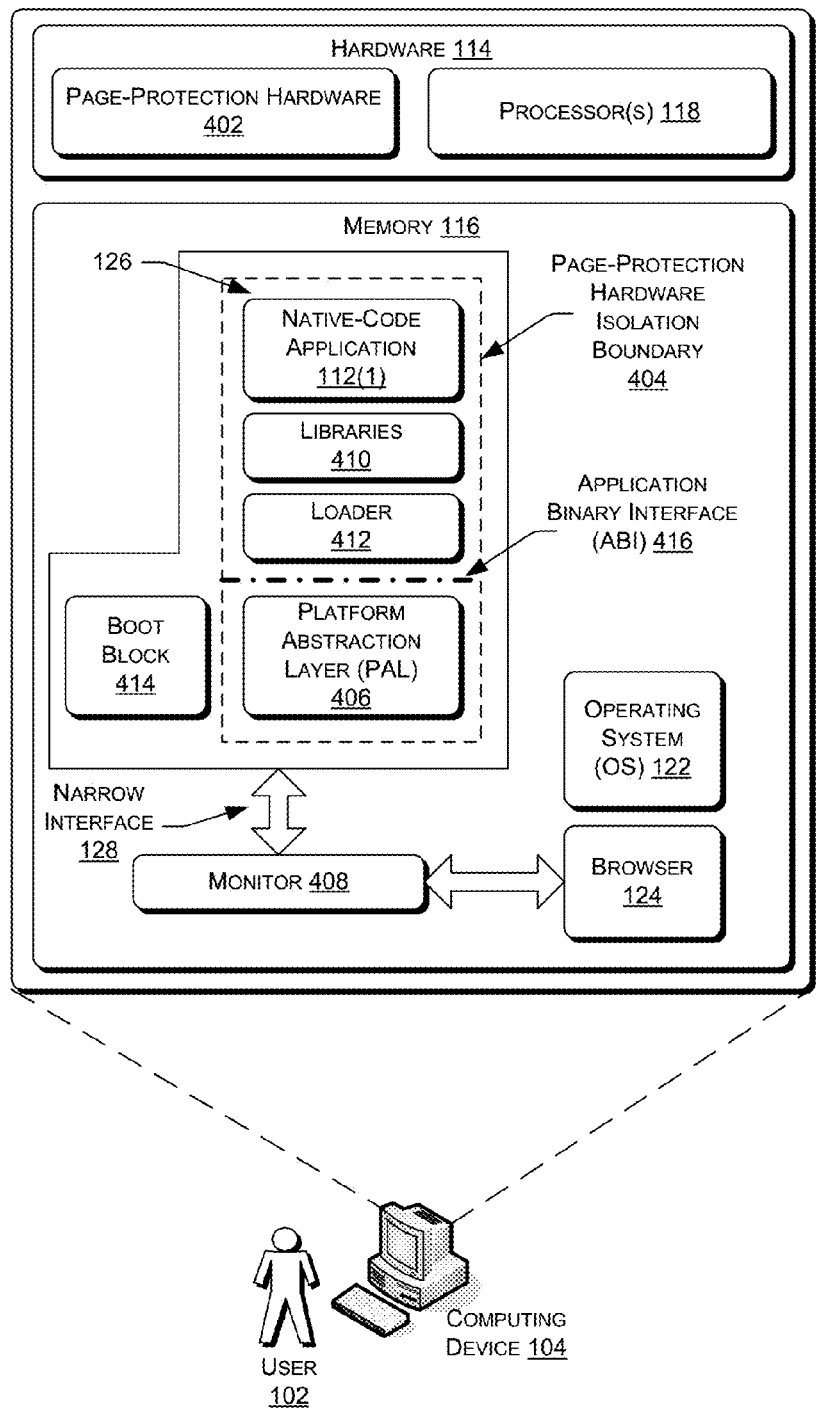
FIG. 4 is a block diagram of the client computing device of FIG. 1 in more detail. As illustrated, this computing device includes a hardware isolation boundary in which the native-code application executes. This device also includes a narrow interface for the application to call to request system services.

FIG. 4 shows additional details of an implementation of the computing device 104 configured to implement the described techniques. The computing device 104 may be representative of any number of devices, including, for example, a personal computer, a portable computer, a communication device, an entertainment device, and so forth. As illustrated, the device 104 again includes the hardware 114 and the memory 116. Here, the hardware 114 includes page-protection hardware 402, such as a memory management unit of the computing device 104. The memory 116, meanwhile, includes computer-readable media in the form of volatile memory, such as Random Access Memory (RAM) and/or non-volatile memory, such as Read Only Memory (ROM) or flash RAM. The memory 116 also stores an operating system 122 and may store one or more application programs that are accessible by and executable on the processor 118. The memory 116 may further store various forms of content.

The memory 116 also includes the native-code application 112(1) (acquired by the user 102 over the network 108). As illustrated, the page-protection hardware 402 functions to create a hardware-enforced isolation boundary 404 around the region of memory 126 in which the application 112(1) resides. As such, the application is allowed to operate within this region of memory 126 but not outside this region. In addition, the application 112(1) may make certain system calls outside of this region 126 via a narrow interface 128 and, optionally, through a platform abstraction layer (PAL) 406. As described in detail below, the PAL 406 may translate calls made from the application in a manner appropriate for the type of operating system 122 on the device 104. That is, the PAL 406 may translate these calls in a certain way for a Windows® operating system and in another way for a Linux® operating system, for example.

Furthermore, once these calls pass through the interface 128, a monitor 408 routes these calls to the browser 124. As such, the monitor 408 and the browser 124 together provide services to the application 112(1) and, hence, act as an operating system for the application. In some instances, the browser 124 comprises the monitor 408 as well as the traditional functionality of the browser. In combination, the browser 124 and the monitor 408 may simply provide only existing traditional services to the application. For instance, the browser may provide memory management (e.g., allocation and de-allocation) memory input/output (10), storage 10, object caching, user input, and other services to the native-code application 112(1).

In other instances, however, the browser 124 may be modified to include additional functionality and, hence, to provide additional or different services to the native-code application 112(1). For instance, the browser may expose a video display block image transfer (BLIT) interface to the application. This interface may form a portion of the narrow interface 128. By configuring the browser to expose this video blitting interface, the application may execute a block image transfer to the browser 124 each time the application wishes to display an image within the browser 124. While this interface requires the adding of functionality to the browser 124, enabling the application to "BLIT" image representations creates a secure and easy way for applications of any kind to display desired images in the browser 124. Similarly, in some instances the browser may be modified to include an audio channel interface that is exposed to the native-code application. Again, such an interface may form a portion of the illustrated narrow interface 128 and may allow an array of different applications to safely and easily send desired audio for output of the audio via the browser 124.

FIG. 4 also illustrates that one or more libraries 410 (standard or otherwise) may be included in the portion of memory 126 assigned to the application and, as such, may be accessible by the application 112(1). This region may also include a loader 412 and a boot block 414 to load and initialize the application, as discussed in detail below.

In some instances, the techniques described with reference to FIGS. 1-4 may be implemented via a plug-in to the browser 124, although other implementations may use other technologies. In each instance, however, the techniques strive to meet the following four design goals: security, operating system (OS) independence, performance and legacy support.

Addressing security first, the particular form of security required for web applications comprises protecting the client computing device 104 against malicious code. Part of what makes web applications attractive is that they are supposed to run safely without requiring explicit trust assumptions from the user 102. This stands in contrast to installed desktop applications, which have nearly unfettered access to the client computing device 104, so users make trust assumptions whenever they install a desktop program from a compact disc (CD) or via the Internet. Web applications are considered safe because they execute within a sandbox that sharply restricts the reach of the program.

Next, the techniques strive for OS-independence. Unlike desktop applications, web applications are not tied to a particular operating system, because they do not make direct use of OS services. Instead, web applications invoke services provided by the browser or by a browser plug-in, which is responsible for exporting the same interface and semantics across OS implementations. Ideally, web applications are also independent of the particular browser in which they run.

In addition, the techniques described herein strive to enable high performance of the application 112(1) running on the computing device 104. Simple web applications, such as web pages with dynamic menus, may not require much performance from their execution environments. However, the performance demands may be significant for feature-rich applications that provide functionality comparable to desktop applications, such as animated 3D rendering.

Finally, the techniques strive to enable legacy support for native-code applications, such as the native code application 112(1) shown in the device 104 of FIG. 4. Again, leveraging existing applications is highly preferable to developing complex, feature-rich applications, which requires an enormous effort and an enormous cost.

To accomplish the four goals, the described techniques including the following four main concepts, described above and now described in detail below: (1) executing a native-code application 112(1) behind a hardware-enforced memory region 126 and providing a narrow interface 128 from the region (i.e., a "picoprocess"); (2) providing a platform abstraction layer (PAL) 406 to provide an OS-independent Application Binary Interface (ABI) 416; (3) providing hooks to existing browser mechanisms to provide applications with system services (e.g., network communication, user interface, local storage, etc.) that respect browser security policies, and (4) lightweight modifications to existing tool chains and code bases of the native-code applications for retargeting legacy code to the environment of FIG. 4.

The Picoprocess

The first technique is the picoprocess, which can be thought of as a stripped-down virtual machine without emulated physical devices, MMU, or CPU kernel mode. Alternatively, a picoprocess can be thought of as a highly restricted OS process that is prevented from making kernel calls. In either view, a picoprocess is a single hardware-memory-isolated address space with strictly user-mode CPU execution and a very narrow interface to the world outside the picoprocess, as illustrated in FIG. 4.

A browser plug-in that includes the monitor 408 may create the picoprocesses. Like a virtual machine monitor (in the VM analogy) or an OS kernel (in the OS process analogy), the monitor 408 is part of the browser's trusted code base, ("TCB"), so keeping the monitor small is important. The picoprocess communicates by making calls to the monitor 408.

Because the monitor 408 uses OS services to create and manage picoprocesses, it is necessarily OS-specific. Moreover, to ease the implementation burden and help keep the monitor 408 simple, the described techniques do not generally enforce a standard narrow interface. The specific set of calls, as well as the call invocation mechanism, may vary depending on the underlying OS platform. The discussion below describes some differences regarding Linux® and Windows® implementations. In terms of functionality, the provided calls provide means for memory allocation and de-allocation, raw communication with the browser, raw communication with the origin server, access to uniform resource location (URL) query parameters, and picoprocess exit.

The simplicity of the narrow interface makes it very easy to implement on commodity operating systems, which assists OS-independence. This simplicity also aids security, since it is much easier to reason about the security aspects of a narrow interface with simple semantics than a wide interface with complex semantics. Because a picoprocess executes native code, it typically provides good performance. However, it is not necessarily clear that this architecture supports legacy code that was written with the expectation of running in an OS process with access to rich OS services. The discussion addresses this point below.

Platform Abstraction Layer

As mentioned in the previous sub-section, the narrow interface may vary slightly across OS platforms. For OS-independence, the techniques define a consistent Application Binary Interface (ABI) 416 irrespective of the underlying OS. By necessity, the ABI 416 varies across architectures, so the x86 ABI is different from the PowerPC ABI.

The ABI 416 is exported by an OS-specific Platform Abstraction Layer (PAL) 406, which translates the OS-independent ABI 416 into the OS-specific calls of the monitor 408. The PAL 406 is included with the OS-specific implementation, while everything above the ABI 416 is native code that a content provider (e.g., a server) delivers. The PAL 406 runs inside the picoprocess, so its code is not trusted. The narrow interface 128 provides security, while the PAL 406 merely provides ABI consistency across different host operating systems, such as the operating system 122 of the computing device 104 of the user 102.

In some instances, all calls from the native-code application 112(1) are non-blocking except for poll, which can optionally yield until I/O is ready. This provides sufficient functionality for user-level threading. For illustration purposes only, the following discussion presents one example of the ABI 416. For memory allocation and de-allocation, the ABI 416 includes the following two calls:

```
void *xabi_alloc(
    void *start, long len);
```

Map len zero-filled bytes of picoprocess memory, starting at start if specified. Return the address.

int xabi_free(void*start);

Free the memory region beginning at start, which must be an address returned from xabi alloc. Re-turn 0 for success or −1 for error.

As described below, the picoprocess appears to the browser 124 as a web server and communication is typically over HTTP. When the browser 124 opens a connection to the picoprocess, this connection can be received by the following call:

int xabi_accept 0;

Return a channel identifier, analogous to a Unix® file descriptor or a Windows® handle, connected to an incoming connection from the browser 124. Return −1 if no incoming connection is ready.

The picoprocess can also initiate connection to the server that provided the picoprocess application. To initiate a connection to the home server, the picoprocess uses the following call:

```
int xabi_open_url(
    const char * method,
    const char *url);
```

Return a channel identifier connected to the given URL, according to the specified method, which may be "get", "put", or "connect". Fetch and cache the URL according to the Same Origin Policy (SOP) rules for the domain that provided the picoprocess.

The operations that can be performed on an open channel are read, write, poll, and close:

```
int xabi_read(
    int chnl, char *buf, int len);
int xabi_write(
    int chnl, char *buf, int len);
```

Transfer data on an open channel. Return the number of bytes transferred, 0 if the channel is not ready, or −1 if the channel is closed or failed.

```
typedef struct {
    int channel;
    short events; /* requested */
    short revents; /* returned */
} xabi_poll_fd;
int xabi_poll(
    xabi_poll_fd *pfds, int npfds, bool block);
```

Indicate the ready status of a set of channels by updating events. If block is true, do not return until at least one requested event is ready, thereby allowing the picoprocess to yield the processor. Return the number of events ready; do not return 0 if block is true.

int xabi close(int chnl);

Close an open channel. Return 0 for success or −1 for error.

During picoprocess boot, the loader 412 needs to know the URL from which to fetch the application image. The techniques could require a custom loader for each application, with the URL baked into the loader's image. Conversely, the techniques may include a general loader that reads the application URL from the query parameters of the URL that launched the picoprocess. The following call, which is normally used only by the loader 412, provides access to these parameters. Note that there is no corresponding call via the interface 128, as the parameters are written into the PAL 406 during picoprocess initialization.

const char**xabi_args( );

Return a pointer to a NULL-terminated list of pointers to arguments specified at instantiation.

Lastly, the ABI 416 provides a call to exit the picoprocess when it is finished:

void xabi exit( );

Although the PAL 406 runs inside the picoprocess, it is not part of the native-code application 112(1). More specifically, it is not delivered with the OS-independent application code. Instead, the appropriate OS-specific PAL 406 remains resident on the client computing device 104, along with the monitor 408 and the browser 124, whose implementations are also OS-specific. When a native-code application is delivered to the device 104, the application and the PAL 406 are loaded into the picoprocess and linked via a simple dynamic-linking mechanism: The ABI 416 de-fines a table of function pointers and the calling convention for the functions. For x86 architectures, this calling convention is cdec 1; for the PowerPC, it is the one standard calling convention; and, for other architectures, other calling conventions may be defined.

In some instances, the techniques create a simple shim library (included in the libraries 410 of FIG. 4) to which an application may statically link. This library may export a set of symbols (xabi read, xabi openurl, etc.) that obey the function linkage convention of the developer's tool chain. The shim converts each of these calls to the corresponding ABI call in the PAL 406. This shim thus provides a standard Application Programming Interface (API) to native-code applications that have been modified to function in this environment.

Services Via Browser Mechanisms

In order for the browser 124 to function as an operating system for the native-code application 112(1), a key principle is that the browser contains sufficient functionality to support the system services needed by web applications. In fact, the browser 124 not only has sufficient functionality, but employing the browser as an operating system also improves security. That is, because the techniques reuses the existing security policy—and much of the mechanism—in the browser, the described techniques do not introduce any new security vulnerabilities in some instances.

The monitor 408 has the job of providing the services indicated by the narrow interface 128. These services include memory allocation/de-allocation, access to URL query parameters, and picoprocess exit, among others. The monitor 408 also provides a communication path to the browser 124, via which the picoprocess appears as a web server to the browser 124. This communication path enables the native-code application 112(1) to use read and write calls to serve HTTP to the browser 124. From the perspective of the browser 124, these HTTP responses appear to come from the remote server that supplied the native-code application 112(1). This approach is secure, since the native-code application 112(1) is unable to do anything that the remote server could not have done by serving content directly over the Internet to the browser 124 in some instances.

Using the picoprocess-to-browser communication path, the native-code application 112(1) can employ JavaScript code in the browser 124 to perform functions on its behalf, such as user interface operations, DOM manipulation, and access to browser cookies. In some applications, the native-code application 112(1) may provide an HTML page to the browser 124, with the page containing JavaScript stubs which translate messages from the picoprocess into JavaScript function invocations.

It would be possible but awkward to use JavaScript for network communication. To pass through JavaScript, an application or library binary from a remote server would have to be uuencoded, encapsulated in JSON, transferred via HTTP, de-encapsulated, and decoded. To simplify this process, the described techniques provide the ABI call "xabi openurl" to allow direct communication between a picoprocess and its origin server. Both Linux® and Windows® monitors 408 provide corresponding calls that implement the primitives efficiently.

Lightweight Code Modification

In some instances, the techniques require a rather small effort to port a native-code application 112(1), library 410, or tool chain to the minimalist ABI 416. This is surprising because this legacy code was written to run atop an operating system 122, while the described techniques essentially eliminate the OS 122 from the perspective of the application and still enable the legacy code to perform its main function.

Although the particular modifications required are application-dependent, in some instances these modifications follow a design pattern that covers five common aspects: disabling irrelevant dependencies, restricting application interface usage, applying failure-oblivious computing techniques, internally emulating syscall functionality, and (only when necessary) providing real syscall functionality via new calls tailored to the narrow interface 128.

The first step in some instances is to use compiler flags to disable dependencies on irrelevant components. Not all libraries and code components are necessary for use within the web-application framework, and removing them reduces the download size of the web application and also reduces the total amount of code that needs to be ported.

The second step in some instances is to restrict the interfaces that the native-code application 112(1) uses. For instance, an application might handle I/O either via named files or via stdin/stdout, and the latter may require less support from the system. Depending on the application, restricting the interface is done in various ways, such as by setting command-line arguments or environment variables.

The third step in some instances is to identify which of the remaining system calls of the native-code application 112(1) can be handled trivially. For example, the techniques can often return error codes indicating failure, in a manner similar to failure-oblivious computing.

The fourth step in some instances is to emulate syscall functionality within the syscall interpose layer. For instance, some applications read library files from a file system at runtime. Here, the library files may be packaged as a tar ball, and a subset of file-system calls using libtar to access the libraries may be emulated. The tar ball may be read-only, which may be all that these applications require. For other ported applications, the techniques could also provide read/write access to temporary files by creating a RAM disk in the interpose layer. Code in the interpose layer looks at the file path to determine whether to direct calls to the tar ball, to the RAM disk, or to somewhere else, such as a file downloaded from the origin server.

The fifth and final step in some instances is to provide real backing functionality for the remaining system calls via the ABI 416. For some applications, most of the remaining syscalls are for user input and display output, which may be routed to UI in the browser 124.

In some instances, the first three steps are application-specific, but for the final two steps, much of the syscall support developed for one application may be readily reusable for other applications. For any given application, once the needed modifications are understood, the changes may become mechanical. Thus, in some instances the task of maintaining both a desktop version of a native-code application 112(1) and a version for implementation with the techniques described herein is fairly straightforward for a developer, using a configure flag to specify the build target. Additionally, it is noted that this is already a common practice for a variety of applications that compile against Linux® and BSD and Win32 syscall interfaces.

OS-Specific Implementations

The following sub-sections describes the example implementations of the described techniques on Linux® and Windows®, as well as a proxy-based browser integration, with reference to FIG. 4. Although they have some significant differences, the two described implementations share a great deal common structure. The main aspect in which they differ is in the kernel support for picoprocess isolation and communication, which will be discussed after first describing the common aspects.

Monitor, Boot Block and Platform Abstraction Layer (PAL)

The monitor 408 is a user-mode process that creates, isolates, and manages each picoprocess, and that provides the functionality of calls to the narrow interface 128 from the native-code application 112(1). A picoprocess is realized as a user-level OS process, thus leveraging the hardware memory isolation that the OS already enforces on its processes. Before creating a new picoprocess, the monitor 408 first allocates a region of shared memory, which will serve as a communication conduit between the picoprocess and the monitor 408. Then, the picoprocess is created as a child process of the Monitor process.

This child process begins by executing an OS-specific boot block 414, which performs three steps. First, it maps the shared memory region into the address space of the child process, thereby completing the communication conduit. Second, it makes an OS-specific kernel call that permanently revokes the ability of the child process to make subsequent kernel calls, thereby completing the isolation. Third, it passes execution to the OS-specific PAL 406, which in turn loads and passes execution to the native-code application 112(1).

Note that the boot block 414 is part of the TCB, even though it executes inside the child process. The child process does not truly become a picoprocess until after the boot block 414 has executed. At that point, the child process has no means to de-isolate itself, since this would require a kernel call but the picoprocess is prevented from making kernel calls.

After transferring control to the application 112(1), the PAL 406 has the job of implementing the ABI 416 by making appropriate calls to the monitor 408. To make a call, the PAL 406 writes the call identifier and arguments into the shared memory region, then traps to the kernel. In an OS-specific manner (described below) the kernel notifies the monitor 408 of the call. The monitor 408 then reads the shared memory, performs the indicated operation, writes the result to the shared memory, and returns control to the picoprocess.

Although the monitor 408 has different implementations on different operating systems, it handles most calls in more-or-less the same way irrespective of the OS 122. The alloc and free calls are exceptions to this rule, so their different implementations are described in the following two sections. For accept, the monitor 408 maintains a queue of connection requests from the browser 124, and each call dequeues the next request. The openurl call makes an HTTP connection to a remote resource; the returned channel identifier corresponds to either a socket handle or a file handle, depending on whether the requested data is cached. The I/O calls read, write, poll, and close are implemented by reading, writing, polling, and closing OS file descriptors on sockets and files. The exit call simply terminates the child process.

Linux® Kernel Support

The Linux® implementation described below involves no custom kernel code. Instead, it makes use of the ptrace facility of the Linux® kernel, which enables a process to observe and control the execution of another process.

As described above, the boot block 414 makes a kernel call to revoke the ability of the child process to make subsequent kernel calls. In this implementation, this is done by calling ptrace (TRACEME), which causes the kernel to intercept the entry and exit of every subsequent syscall, transferring control to the Monitor parent process. On entry to a syscall, the monitor 408 normally replaces whatever system call the child process requested with a harmless system call (e.g., getpid) before releasing control to the kernel. This prevents the child process from passing a syscall to the OS 122.

Syscalls are also legitimately used by the PAL 406 to signal an appropriate call to the narrow interface 128. Thus, when ptrace notifies the monitor 408 of an entry to a syscall, the monitor 408 checks whether the shared memory contains a legitimate call identifier and arguments. If it does, the monitor 408 performs the operation and returns the result, as described above. If the call is a memory-management operation (alloc or free), it has to be handled specially, because Linux® does not provide a mechanism for a process to allocate memory on behalf of another process. So, in this case, the monitor 408 does not overwrite the syscall with getpid. Instead, it overwrites the syscall with mmap and a set of appropriate arguments. Since the return from the syscall is also intercepted by ptrace, the monitor 408 has an opportunity to write a return value for the alloc call into the shared memory, based on the return value from the mmap syscall.

Use of an existing kernel facility (ptrace) enables the described Linux® implementation to be deployed without kernel-module installation or root privilege. However, it may entail a slight performance hit, because every call may require three syscalls from the monitor 408: one to swap out the syscall with getpid or mmap, a second to enter the kernel, and a third to resume the picoprocess. More importantly, if the monitor 408 fails and exits without proper signal handling, the child process may continue to run without having its syscalls intercepted. This failure condition could turn the picoprocess back into a regular OS process, which would violate security. These performance and security problems, however, may be mitigated by using a custom kernel module instead of ptrace.

Windows® Kernel Support

In the described Windows® implementation, when the boot block 414 of the child process makes a kernel call to establish an interposition on all subsequent syscalls, it makes this call to a custom kernel module. Because every Windows® thread has its own pointer to a table of system call handlers, this custom kernel module is able to isolate a picoprocess by replacing the handler table for the thread of that process. The replacement table converts every user-mode syscall into an inter-process call (IPC) to the user-space monitor 408. For a syscall originating from kernel mode (e.g., for paging), the custom kernel module passes the call through to the original handler, preserving the dispatcher's stack frame for the callee's inspection.

When the monitor 408 receives an IPC, it reads the call identifier and arguments from the shared memory and performs the operation. Unlike the Linux® case, no special handling is required for memory-management operations, because Windows® NtMapViewOfSection allows the monitor 408 to map memory on behalf of its child process.

Although the custom kernel module has to be ported to each version of Windows® on which it runs, the changes are minimal, involving two constant scalars and a constant array: (1) the offset in the kernel thread block for the pointer to the syscall handler table, (2) the count of system calls, and (3) for each system call, the total parameter byte count. This information is readily available from the kernel de-bugger in the Windows® Driver Kit.

As an alternative to implementation of the customer kernel module described above would be to patch every entry in the standard system-call table. However, this may transparently change the behavior of every process in the system in some instances. Furthermore, even if the interposed handlers were to properly fall through to the original handlers, they would still add overhead to every system call.

Loaders

The Linux® toolchain emits standard statically-linked Elf binaries. These binaries are loaded by a small loader. This loader reads the target binary, parses it to learn where to map its program regions, and looks up two symbols: a global symbol where the binary's copy of the custom library discussed above expects to find a pointer to the dispatch table of the PAL 406, and the address of the start symbol. Then, the loader maps the program, writes the dispatch table location into the pointer, and jumps to start.

The Windows® toolchain, meanwhile, emits statically-linked .EXE binaries in the native PE-COFF format of Windows®. This loader performs the corresponding tasks to map and launch PE executables.

Browser Integration

Recall that the native-code application 112(1) appears to the browser 124 as part of the origin server that just happens to handle HTTP requests very quickly; this ensures that the picoprocess is governed by the Same-Origin Policy just as is the origin server. In one implementation, the techniques are integrated into the browser 124 via an HTTP proxy. This approach is expedient, and one implementation serves all makes of browser 124. The proxy passes most HTTP requests transparently to the specified host. However, if the URL's path component begins with a specified entry, the proxy interposes on the request to direct the request to an existing picoprocess or to create a new one. The proxy is integrated with the monitor process, and allows each picoprocess to contact its origin server via xaxopenurl. This contact employs the same mechanism that fetches ordinary URLs, and thus obeys the SOP.

By implementing the described techniques, for example, as a plug-in to the browser 124, the techniques enable developers to adapt legacy code for use in rich web applications, while maintaining security, performance, and OS-independence. This security stems from the use of the picoprocess minimalist isolation boundary and browser-based services. Furthermore, this results in a TCB that is orders of magnitude smaller than alternative approaches to the same problem.

The OS-independence, meanwhile, stems from the use of picoprocesses and its platform abstraction layer (PAL) 406. Furthermore and as discussed above, applications compiled on any toolchain may run on any OS host. Next, the performance of the native-code application 112(1) derives from native code execution in picoprocesses. In many instances, the compute performance of these applications in the browser 124 is comparable to native execution. Finally, the legacy support comes from lightweight code modification. Over decades of software development in type-unsafe languages, vast amounts of design, implementation, and testing effort have gone into producing powerful legacy applications. By enabling developers to leverage this prior effort to deploy and execute into web applications, the techniques described above may change the landscape of web applications.

Example Process

Figure 5:
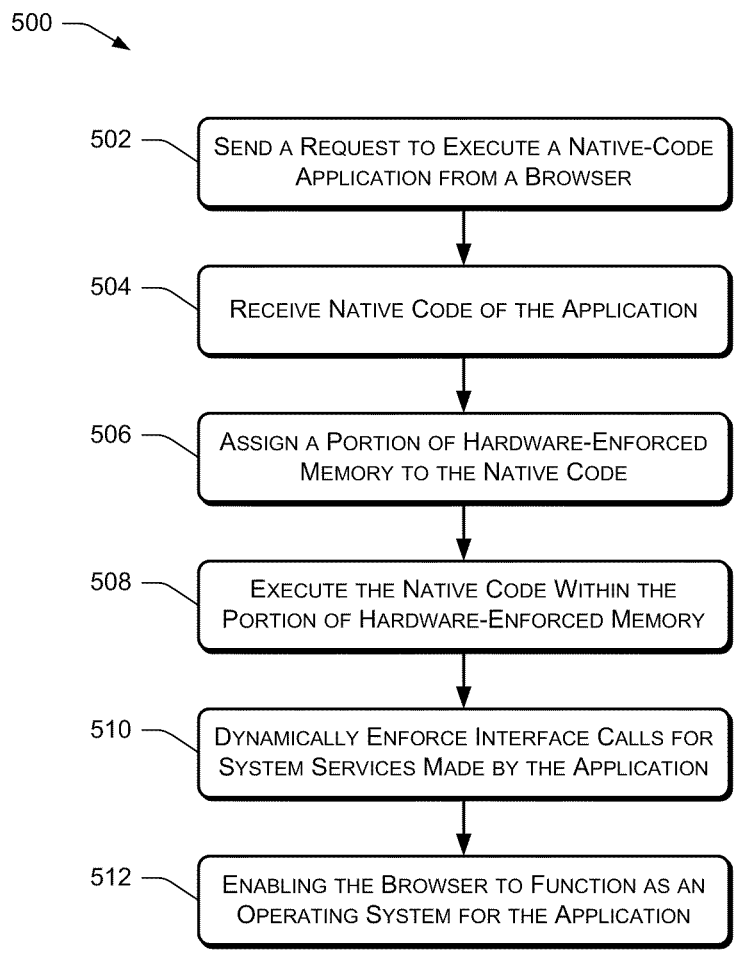
FIG. 5 is a flow diagram of an example process for deploying native-code desktop applications over a network with use of the techniques described herein.

FIG. 5 is a flow diagram illustrating a process 500 for executing applications written in native codes over a network and through use of a browser as an operating system for the applications. The process 500 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

Process 500 includes an operation 502, which represents a client computing device sending a request, from a browser of the device, to execute a native-code application. For instance, the device 104 of FIG. 1 may send a request to execute the native-code application 112(1) that the content provider 106(1) stores. Next, an operation 504 represents that the device receives native code of the application for execution. At an operation 506, the device assigns a portion of memory (that hardware of the device enforces) to the received native code.

After assigning the memory, the native-code application is able to securely execute on the client computing device within this assigned memory at an operation 508. Furthermore, as the application makes calls for system services from this assigned portion of memory, the device dynamically enforces these interface calls at an operation 510. By doing so, the device prevents the application from accessing the operating system of the device as well as other portions of the memory, thus restricting the application's ability to damage the client computing device. Finally, these calls are routed to a browser of the computing device. As such, the browser is able to function as an operating system for the native-code application at an operation 512.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    sending a request to execute an application comprising native code from a computing device;
    responsive at least in part to the sending of the request, receiving the native code of the application at the computing device;
    assigning, by a monitor process, a portion of memory of the computing device to the application comprising the native code, the portion of the memory being enforced by hardware of the computing device;
    making an operating system (OS)-specific kernel call that revokes an ability of the application to communicate kernel calls to an OS by causing an OS kernel to transfer control of intercepting kernel calls to the monitor process;
    executing the native code of the application within the portion of the memory being enforced by the hardware;
    within the portion of the memory being enforced by the hardware, translating OS-independent calls from the executing application to OS-specific calls based on a table of function pointers and calling conventions for corresponding functions; and
    monitoring, by the monitor process, calls made by the application for system services outside of the portion of the memory being enforced by the hardware to determine whether the respective calls are permissible.

2. A method as recited in claim 1, wherein the hardware of the computing device comprises page-protection hardware of the computing device.

3. A method as recited in claim 1, wherein the sending of the request comprises sending a request over a network to a server that stores the application comprising the native code.

4. A method as recited in claim 1, wherein the native code comprises binary code in an instruction set of a processor of the computing device.

5. A method as recited in claim 2, wherein the page-protection hardware of the computing device comprises a memory management unit of the computing device.

6. A method as recited in claim 1, wherein the hardware of the computing device comprises segmentation hardware of the computing device.

7. A method as recited in claim 1, further comprising executing a block image transfer (BLIT) of a representation of an image from the portion of the memory to a browser of the computing device through an interface provided by the browser.

8. One or more computer-readable storage hardware devices storing computer-executable instructions that, when executed on one or more processors, cause the one or more processors to perform acts comprising:
    sending a request to execute an application comprising native code from a computing device;
    responsive at least in part to the sending of the request, receiving the native code of the application at the computing device;
    assigning, by a monitor process, a portion of memory of the computing device to the application comprising the native code, the portion of the memory being enforced by hardware of the computing device;
    making an operating system (OS)-specific kernel call that revokes an ability of the application to communicate kernel calls to an OS by causing an OS kernel to transfer control of intercepting kernel calls to the monitor process;
    executing the native code of the application within the portion of the memory being enforced by the hardware;
    within the portion of the memory being enforced by the hardware, translating OS-independent calls from the executing application to OS-specific calls based on a table of function pointers and calling conventions for corresponding functions; and
    monitoring, by the monitor process, calls made by the application for system services outside of the portion of the memory being enforced by the hardware to determine whether the respective calls are permissible.

9. One or more computer-readable storage hardware devices as recited in claim 8, wherein the hardware of the computing device comprises page-protection hardware of the computing device.

10. One or more computer-readable storage hardware devices as recited in claim 8, wherein the sending of the request comprises sending a request over a network to a server that stores the application comprising the native code.

11. One or more computer-readable storage hardware devices as recited in claim 8, wherein the native code comprises binary code in an instruction set of a processor of the computing device.

12. A system comprising:
    one or more processors; and
    one or more computer-readable hardware devices storing computer-executable instructions that, when executed on one or more processors, cause the one or more processors to perform acts comprising:
        sending a request to execute an application comprising native code from a computing device;
        responsive at least in part to the sending of the request, receiving the native code of the application at the computing device;

assigning, by a monitor process, a portion of memory of the computing device to the application comprising the native code, the portion of the memory being enforced by hardware of the computing device;

making an operating system (OS)-specific kernel call that revokes an ability of the application to make kernel calls to an OS by causing an OS kernel to transfer control of intercepting kernel calls to the monitor process;

executing the native code of the application within the portion of the memory being enforced by the hardware;

within the portion of the memory being enforced by the hardware, translating OS-independent calls from the executing application to OS-specific calls based on a table of function pointers and calling conventions for corresponding functions; and monitoring, by the monitor process, calls made by the application for system services outside of the portion of the memory being enforced by the hardware to determine whether the respective calls are permissible.

13. A system as recited in claim 12, wherein the hardware of the computing device comprises page-protection hardware of the computing device.

14. A system as recited in claim 12, wherein the sending of the request comprises sending a request over a network to a server that stores the application comprising the native code.

15. A system as recited in claim 12, wherein the native code comprises binary code in an instruction set of a processor of the computing device.

16. A system as recited in claim 12, the acts further comprising:
enabling a browser of the computing device to function as an operating system for the application comprising the native code, wherein the enabling of the browser of the computing device to function as an operating system comprises enabling the browser to provide network input/output (I/O) to the native code of the application.

17. A system as recited in claim 12, the acts further comprising:
enabling a browser of the computing device to function as an operating system for the application comprising the native code, wherein the enabling of the browser of the computing device to function as an operating system comprises enabling the browser to provide storage input/output (I/O) to the native code of the application.

18. A system as recited in claim 12, the acts further comprising:
enabling a browser of the computing device to function as an operating system for the application comprising the native code, wherein the enabling of the browser of the computing device to function as an operating system comprises enabling the browser to provide object caching to the native code of the application.

19. A system as recited in claim 12, the acts further comprising:
enabling a browser of the computing device to function as an operating system for the application comprising the native code; and
transferring a piece of audio from the portion of the memory to the browser through an interface provided by the browser.

* * * * *